US011187539B2

(12) United States Patent
Maeda et al.

(10) Patent No.: US 11,187,539 B2
(45) Date of Patent: Nov. 30, 2021

(54) TRAVEL CONTROL DEVICE FOR MOVING BODY

(71) Applicant: Hitachi, Ltd., Tokyo (JP)

(72) Inventors: Kenta Maeda, Tokyo (JP); Junya Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 192 days.

(21) Appl. No.: 16/470,456

(22) PCT Filed: Jan. 17, 2017

(86) PCT No.: PCT/JP2017/001314
§ 371 (c)(1),
(2) Date: Jun. 17, 2019

(87) PCT Pub. No.: WO2018/134863
PCT Pub. Date: Jul. 26, 2018

(65) Prior Publication Data
US 2019/0310091 A1    Oct. 10, 2019

(51) Int. Cl.
*G01C 21/30*    (2006.01)
*B60W 50/10*    (2012.01)
(Continued)

(52) U.S. Cl.
CPC ............. *G01C 21/30* (2013.01); *B60W 50/10* (2013.01); *G01C 21/32* (2013.01); *G08G 1/16* (2013.01)

(58) Field of Classification Search
None
See application file for complete search history.

(56) References Cited

U.S. PATENT DOCUMENTS 5,774,824 A * 6/1998 Streit ..................... G01C 21/30
340/990
8,676,430 B1 * 3/2014 Ferguson ............. G05D 1/0212
701/25
(Continued)

FOREIGN PATENT DOCUMENTS

JP    H09-269726 A    10/1997
JP    2002-243469 A    8/2002
(Continued)

OTHER PUBLICATIONS

International Search Report with English translation and Written Opinion issued in corresponding application No. PCT/JP2017/001314 dated Apr. 18, 2017.

*Primary Examiner* — James J Lee
*Assistant Examiner* — Tawri M Matsushige
(74) *Attorney, Agent, or Firm* — Foley & Lardner LLP

(57) ABSTRACT

A travel control device includes an operation acquiring unit for acquiring an operation by a driver of a host moving body; an outside-world information acquiring unit for acquiring outside-world information of the periphery of the host moving body; a moving-body information acquiring unit for acquiring moving-body information relating to a travel state of the host moving body; a travelable-range management unit for managing the range travelable by the moving body; and a control unit for controlling travel by the moving body on the basis of the operation acquired by the operation acquiring unit, the outside-world information acquired by the outside-world information acquiring unit, the moving-body information acquired by the moving-body information acquiring unit, and the travelable range managed by the travelable-range management unit, the travelable-range management unit including a travelable-range enlargement (Continued)

unit for enlarging the travelable range, and a travelable-range evaluation unit for evaluating the travelable range.

10 Claims, 18 Drawing Sheets

(51) Int. Cl.
  *G01C 21/32* (2006.01)
  *G08G 1/16* (2006.01)

(56) References Cited

U.S. PATENT DOCUMENTS

| | | | |
|---|---|---|---|
| 8,954,217 B1 * | 2/2015 | Montemerlo | B60W 50/082 |
| | | | 701/26 |
| 9,227,635 B1 * | 1/2016 | Takamatsu | B62D 5/0433 |
| 10,077,056 B1 * | 9/2018 | Fields | B60W 50/0098 |
| 10,289,113 B2 * | 5/2019 | Perkins | B60W 30/182 |
| 2014/0172300 A1 | 6/2014 | Reich | |
| 2015/0106007 A1 * | 4/2015 | Matsumura | G01C 21/26 |
| | | | 701/408 |
| 2015/0175070 A1 * | 6/2015 | Attard | B60W 60/0053 |
| | | | 340/439 |
| 2016/0259814 A1 * | 9/2016 | Mizoguchi | G01C 21/3837 |
| 2016/0356623 A1 * | 12/2016 | Matsumoto | G08G 1/096811 |
| 2017/0074659 A1 * | 3/2017 | Giurgiu | G01S 19/41 |
| 2017/0123434 A1 * | 5/2017 | Urano | B60W 40/10 |
| 2017/0247040 A1 * | 8/2017 | Miller | B60W 30/182 |
| 2018/0151066 A1 * | 5/2018 | Oba | G01C 21/3407 |
| 2019/0106120 A1 * | 4/2019 | Hatano | B60W 10/04 |
| 2019/0227552 A1 * | 7/2019 | Kato | G05D 1/0088 |

FOREIGN PATENT DOCUMENTS

| | | |
|---|---|---|
| JP | 2007-183432 A | 7/2007 |
| JP | 2007-225911 A | 9/2007 |
| JP | 2009-264938 A | 11/2009 |
| JP | 2010-036856 A | 2/2010 |
| JP | 2014-228637 A | 12/2014 |

* cited by examiner

TRAVEL CONTROL DEVICE FOR MOVING BODY

TECHNICAL FIELD

The present invention relates to a travel control device for a moving body.

BACKGROUND ART

Conventionally, there are known techniques dedicated for car navigation systems and travel control (driving assistance and automatic travel), which generate a map from travel data of a vehicle to automatically enlarge a region where navigation and travel control are possible.

PTL 1 discloses a technique of causing a vehicle to travel on a road so as to create travel trajectory data of the vehicle, obtaining a difference between this travel trajectory data and corresponding road data on an existing road map, and using road data on the existing road map to create a highly precise road map when the difference is equal to or less than a predetermined value.

In PTL 2, a region along a road is divided into multiple small regions, and a map is stored in which a weight indicating presence of a measurement target is associated with each small region. PTL 2 discloses a map generation technique of acquiring position data of the measurement target every time a vehicle equipped with measurement devices travels on the road and adding a weight indicating the presence of the measurement target to a small region corresponding to the position data using the position data.

CITATION LIST

Patent Literature

PTL 1: JP H9-269726 A
PTL 2: JP 2007-183432 A

SUMMARY OF INVENTION

Technical Problem

Both the pieces of related art described in PTL 1 and PTL 2 require travel by a vehicle equipped with a sensor capable of acquiring a self-position and information of peripheral objects with high precision.

PTL 1 assumes the use of the highly precise sensor capable of accurately acquiring the self-position, such as a real time kinematic-global positioning system (RTK-GPS), and thus, it is considered that it is difficult to create an accurate map when a vehicle equipped with a mass-produced low-precision GPS sensor is used.

PTL 2 assumes that an object can be detected with high probability, and has no statement regarding a means for evaluating and determining whether a map created by a sensor with low object detection performance contains sufficient information for vehicle travel control.

The present invention has been made in view of the above problems, and an object thereof is to provide a travel control device for a moving body, which enlarges a travelable range of the moving body and enables evaluation of the travelable range. Another object of the present invention is to provide a travel control device for a moving body that can efficiently generate a travelable range usable for travel control of the moving body at low cost.

Solution to Problem

In order to solve the above-described problems, a travel control device that controls travel of a moving body according to the present invention is provided with: an operation acquiring unit for acquiring an operation by a driver of a host moving body; an outside-world information acquiring unit for acquiring outside-world information of the periphery of the host moving body; a moving-body information acquiring unit for acquiring moving-body information relating to a travel state of the host moving body; a travelable-range management unit for managing the range travelable by the moving body; and a control unit for controlling travel by the moving body on the basis of the operation acquired by the operation acquiring unit, the outside-world information acquired by the outside-world information acquiring unit, the moving-body information acquired by the moving-body information acquiring unit, and the travelable range managed by the travelable-range management unit, the travelable-range management unit including a travelable-range enlargement unit for enlarging the travelable range, and a travelable-range evaluation unit for evaluating the travelable range.

Advantageous Effects of Invention

According to the present invention, the travelable range can be evaluated and enlarged. In this manner, according to the present invention, it is possible to obtain a travelable range that is usable for travel control without using a highly precise sensor.

DESCRIPTION OF EMBODIMENTS

Hereinafter, embodiments of the present invention will be described in detail based on the drawings. Although a description is given by exemplifying a vehicle as a moving body in the embodiments, the moving body is not limited to the vehicle. According to the embodiments, a travel control device is provided with: an operation acquiring unit for acquiring an operation by a driver; an outside-world information acquiring unit for acquiring outside-world information of the periphery of a host moving body; a moving-body information acquiring unit for acquiring moving-body information which is a travel state of the host moving body; a travelable-range management unit for managing a travelable range; and a control unit for controlling travel by the host moving body on the basis of the operation, the travelable range, the outside-world information, and the moving-body information, the travelable-range management unit including a travelable-range enlargement unit and a travelable-range evaluation unit, and the travelable-range evaluation unit determines a possibility of travel control in the travelable range based on at least one of the operation, the outside-world information, and the moving-body information when travel control is performed for evaluation.

According to the embodiments, it is possible to determine whether generated map information (travelable range) has sufficient information for automatic driving of the moving body, and to provide the travel control device that realizes more stable travel control.

First Embodiment

Figure 1:
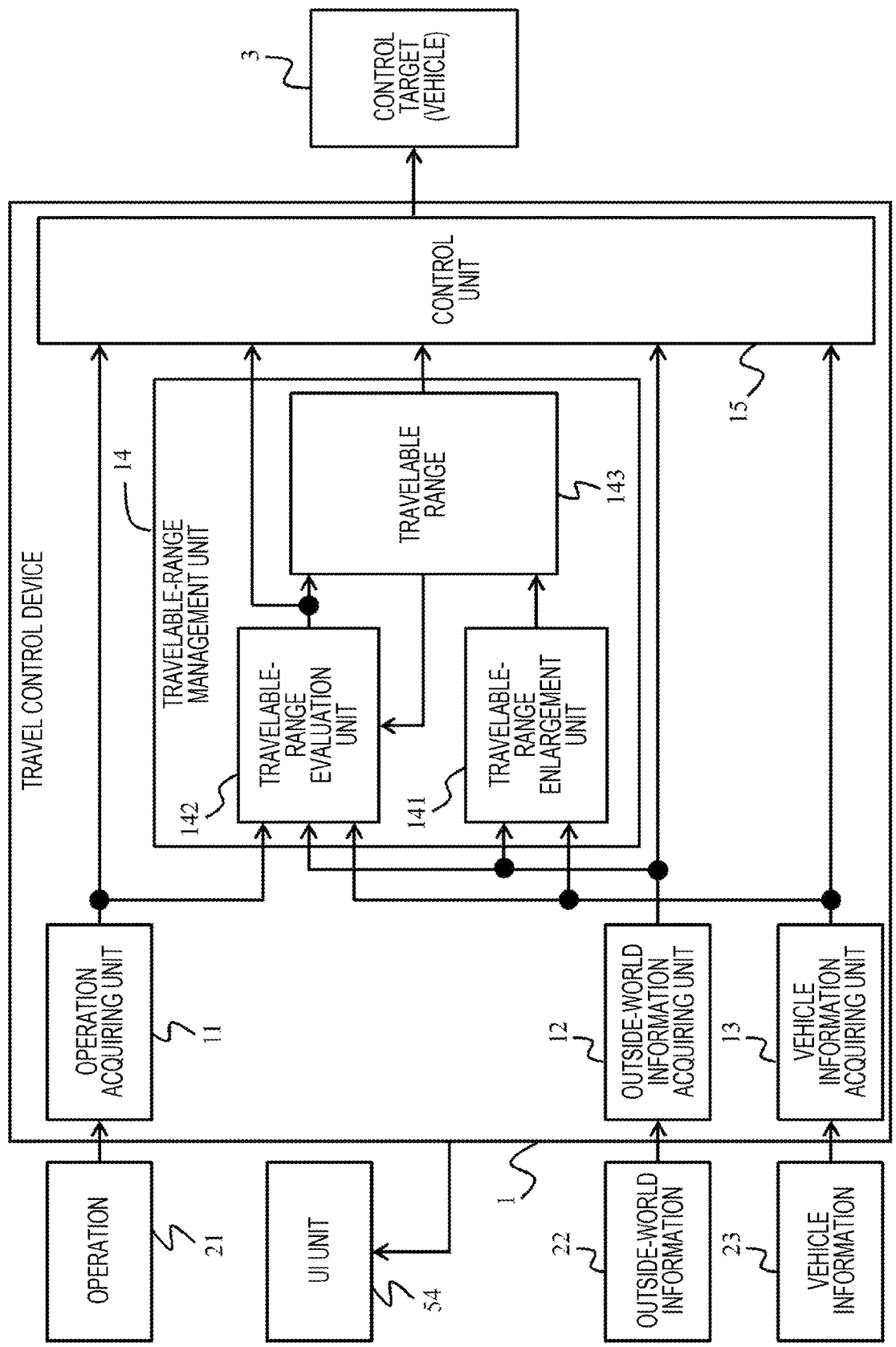
FIG. 1 is a functional block diagram of a travel control device.
Figure 2:
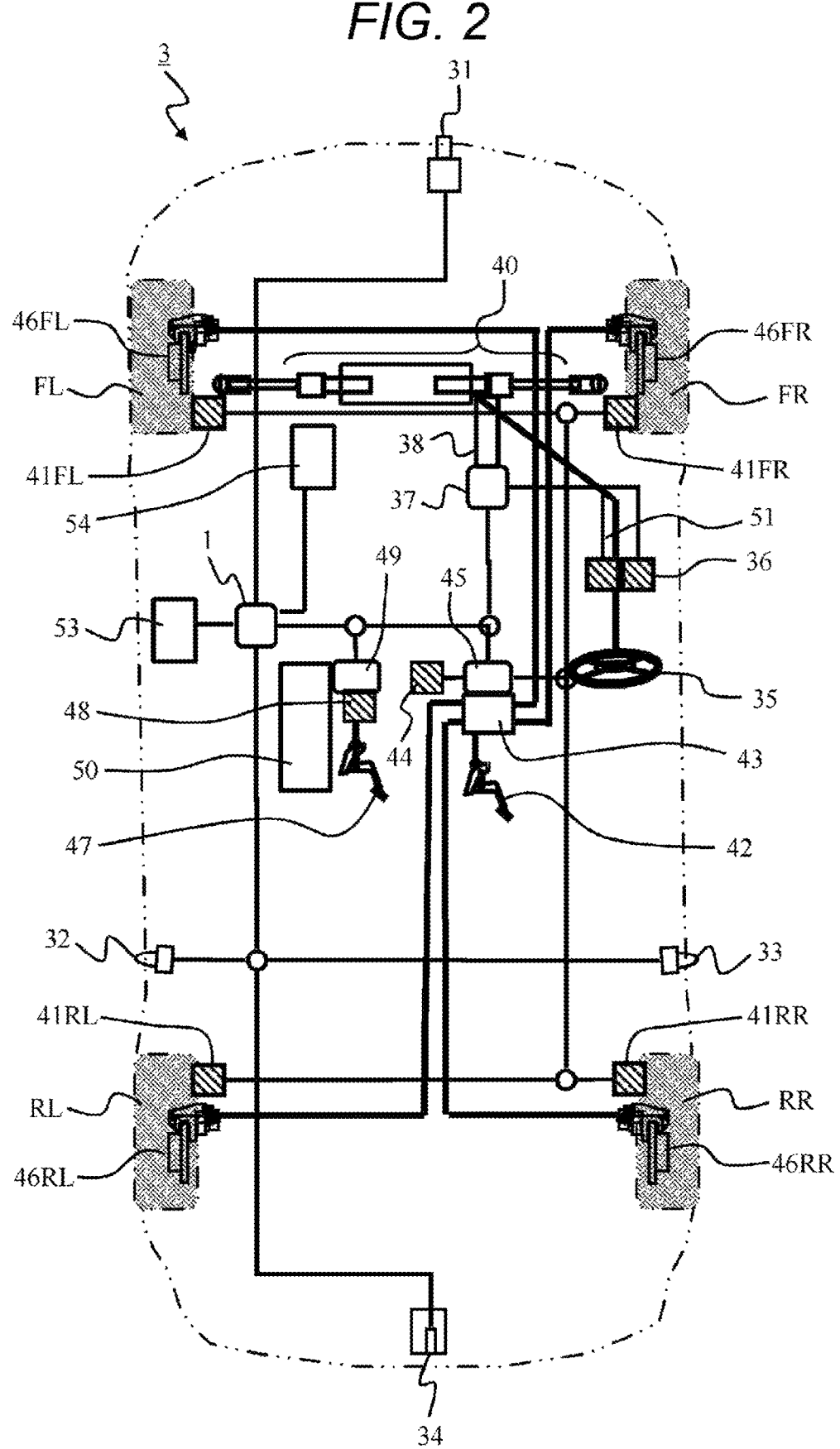
FIG. 2 is a schematic configuration diagram of a vehicle equipped with the travel control device.

A first embodiment will be described with reference to FIGS. 1 to 13. FIG. 1 illustrates a functional block diagram of a travel control device 1. FIG. 2 illustrates an overall configuration of a vehicle (hereinafter sometimes referred to as a host vehicle) 3 as a control target of the travel control device 1.

FIG. 1 is a functional block diagram illustrating a configuration of the travel control device 1 according to the present embodiment. The functional block diagram or the like illustrates a scope necessary for understanding and implementation of the present invention.

The travel control device 1 includes, for example, an operation acquiring unit 11, an outside-world information acquiring unit 12, a vehicle information acquiring unit 13, a travelable-range management unit 14, and a control unit 15. The travel control device 1 is configured, for example, as a computer system that includes a microprocessor, a read only memory (ROM), a random access memory (RAM), a large-scale integration (LSI), a bus, an input/output device, or the like.

The operation acquiring unit 11 acquires an operation 21 of a driver and stores the operation 21 in a storage device (not illustrated) such as a memory in the travel control device 1. Examples of the operation 21 include a steering torque and a steering wheel angle input by the driver via a steering wheel 35 (see FIG. 1), the amount of an accelerator pedal 47 depressed by the driver (see FIG. 1), and a pedal force of the driver stepping on a brake pedal 42 (see FIG. 1), and the like.

A user interface unit (hereinafter, UI unit) 54 is connected to the travel control device 1. The UI unit 54 is a device configured to allow the travel control device 1 to receive an input of driver's intention or selection content and to provide information from the travel control device 1 to the driver. The UI unit 54 corresponds to the "information input device" and the "information providing device". The UI unit 54 can be configured as, for example, a touch panel display or a display provided with a button, a switch, and the like.

The UI unit 54 may be a part of another system such as a navigation device or may be a part of a mobile information terminal, a mobile phone (including a so-called smartphone), a head-mounted display computer, a notebook computer, or the like that is possessed by the driver. The UI unit 54 can be provided not only in the state of being fixed to the vehicle 3 but also in the state of being detachably mounted to the vehicle 3. Incidentally, the driver can also input information (including a command) to the travel control device 1 by, for example, a voice input or a gesture as well as a manual operation.

The outside-world information acquiring unit 12 acquires outside-world information 22 using at least one of sensors 31 to 34 to be described later with reference to FIG. 1. The outside-world information acquiring unit 12 obtains a position and a size of an object (such as an obstacle) in the periphery of the host vehicle 3 from the acquired outside-world information 22. When the obstacle is a moving body, the outside-world information acquiring unit 12 obtains a position, speed information, and the like of the moving body. When the outside-world information acquiring unit 12 detects a road sign, road surface paint, a traffic light, or the like, the outside-world information acquiring unit 12 obtains a position and a type thereof. When image data of a camera 31 is used, it is possible to simultaneously identify a plurality of objects to acquire information. In particular, a stereo camera using two cameras is advantageous since it is also possible to detect a relative distance and a relative speed of a moving body or an obstacle. The outside-world information acquiring unit 12 stores the acquired outside-world information 22 in a storage device in the travel control device 1.

The vehicle information acquiring unit 13 specifies a current position of the host vehicle 3 and acquires an operation state quantity. In a process of specifying the current position of the host vehicle 3 (process of specifying a position and an advancing angle of the host vehicle 3), for example, a current position acquired by a GPS (not illustrated) is used. The advancing angle can be acquired from position information along with a lapse of time during movement. When the GPSs are attached, respectively, to the front and rear of the vehicle 3, it is possible to acquire the advancing angle of the vehicle even while the vehicle is stopped.

Examples of the operation state quantity acquired in the process of acquiring the operation state quantity include a speed, a longitudinal acceleration, a lateral acceleration, the yaw rate, a yaw angle, and the like acquired from a combine sensor 44 (see FIG. 1).

The travelable-range management unit 14 generates a travelable range 143 of the host vehicle 3 based on the operation 21, the outside-world information 22, and vehicle information 23. The travelable-range management unit 14 determines whether the travel control of the host vehicle 3 is possible within the travelable range 143. The travelable-range management unit 14 includes, for example, a travelable-range enlargement unit 141 and a travelable-range evaluation unit 142. The generated travelable range 143 is stored in a storage device (not illustrated).

The travelable range 143 is generated, for example, as map information. The map information includes information on shapes of roads on which the host vehicle 3 is to travel, traffic regulations, landmarks, and the like. The travelable range 143 can be used for automatic driving of the host vehicle 3. That is, the map information as the travelable range 143 is used when a travel plan of the host vehicle 3 is generated and travel of the host vehicle 3 is controlled in accordance with the travel plan.

For example, when the host vehicle 3 turns right or left at an intersection, information on the intersection is acquired as a part of the information of the travelable range 143. Examples of intersection information or road information include the number of lanes of roads at an intersection, a road width, an intersection angle of roads, a lane width, a median width, a crosswalk width, the amount of setback of a crosswalk from an intersection, presence or absence of a signal, and the like. If the outside-world information acquiring unit 12 can obtain positions of objects in the periphery the host vehicle 3 as a point group, information in which the point group is integrated may be defined as the travelable range 143. For example, it is also possible to provide a laser radar to the vehicle 3 so as to detect objects in the periphery of the vehicle as a set of points.

The travelable-range enlargement unit 141 generates the travelable range 143 based on the outside-world information 22 and the vehicle information 23. When the host vehicle 3 travels for the first time, the travelable-range enlargement unit 141 acquires a current position and an advancing angle of the host vehicle 3 using the vehicle information 23, and converts positions of an obstacle, a landmark, a white line on a road surface, and the like in the vicinity of the host vehicle 3, acquired as the outside-world information 22, into absolute coordinates on the basis of the ground. Further, the travelable-range enlargement unit 141 integrates the outside-world information 22 that has been converted to the coordinates as the travelable range 143 of the host vehicle 3.

When travel is performed for the second or subsequent time, the travelable-range enlargement unit 141 estimates or corrects the current position and the advancing angle of the host vehicle 3 based on the travelable range 143 generated by the previous travel, and then, converts the outside-world information 22 into absolute coordinates.

Examples of a method of estimating the current position and the advancing angle include a method of acquiring image data in the periphery of the host vehicle 3 by the camera 31 and collating the acquired image data with a stored outside-world image and position information to specify a position of the host vehicle 3. Alternatively, there is a method of recognizing a specific landmark using an image or the like and specifying a position of the host vehicle 3 based on relative position information of the landmark and the host vehicle 3 and absolute position information of the landmark.

The overall configuration of the vehicle 3 as a control target will be described with reference to FIG. 2. An FL wheel, an FR wheel, an RL wheel, and an RR wheel mean a left front wheel, a right front wheel, a left rear wheel, and a right rear wheel, respectively.

The vehicle 3 includes the travel control device 1 for calculating command values to a steering control mechanism 40, a brake control mechanism 43, and a throttle control mechanism 50 which are configured to control an advancing direction of the vehicle 3 based on the information of the sensors 31, 32, 33, and 34 recognizing the outside world.

Further, the vehicle 3 includes: a steering control device 37 that controls the steering control mechanism 40 based on the command value from the travel control device 1; a brake control device 45 that controls the brake control mechanism 43 based on the command value and adjusts a brake force distribution of each wheel; an acceleration control device 49 that controls the throttle control mechanism 50 based on the command value and adjusts a torque output of an engine; and a display device 54 that displays a travel plan or the like of the host vehicle 3.

As the sensors 31, 32, 33, and 34 recognizing the outside world, for example, the camera 31 is provided on the front side, laser radars 32 and 33 are provided on the left and right sides, and a millimeter wave radar 34 is provided on the rear side. These sensors 31 to 34 can detect a relative distance and a relative speed between the host vehicle 3 and another vehicle in the surroundings.

The vehicle 3 includes a communication device 53 that performs road-to-vehicle or vehicle-to-vehicle communication. The road-to-vehicle communication is communication performed between the vehicle 3 and road-side equipment (such as a road-side machine), and traffic light information, traffic regulation information, road information, and the like, for example, are transmitted from the road-side equipment to the vehicle 3. The road-side machine is communication equipment installed at the side of a road so as to communicate with a vehicle. The vehicle-to-vehicle communication is communication in which vehicles mutually transmit and receive a position, a speed, vehicle control information, and the like.

Incidentally, FIG. 2 illustrates the configuration example in which the camera, the millimeter wave radar, the radar sensor, and the like are used in combination. However, the present invention is not limited to the illustrated configuration example, and for example, an ultrasonic sensor, a stereo camera, an infrared camera, or the like may be used. Alternatively, a laser radar capable of sensing the periphery at 360° may be mounted in the vicinity of the ceiling or the like of the vehicle 3. Sensor signals output from the above-described sensor group are input to the travel control device 1 in a wired or wireless manner.

A memory such as a ROM of the travel control device 1 stores a computer program that realizes each process to be described later. Although details will be described later, the travel control device 1 calculates a command value of each actuator (the steering control mechanism 40, the brake control mechanism 43, and the throttle control mechanism 50) configured to control the vehicle travel in accordance with the generated travel plan. The control devices (the steering control device 37, the brake control device 45, and the acceleration control device 49) of the respective actuators 40, 43, and 50 receive the command values of the travel control device 1 by communication, and control the respective actuators 40, 43, and 50 based on the command values.

Next, an operation of a brake of the vehicle 3 will be described. In a state where the driver is driving the vehicle 3, a pedal force of the driver stepping on the brake pedal 42 is boosted with a brake booster (not illustrated), and a master cylinder (not illustrated) generates a hydraulic pressure in response to the force. The generated hydraulic pressure is supplied via the brake control mechanism 43 to wheel cylinders 46FL, 46FR, 46RL, and 46RR provided on the respective wheels.

Each of the wheel cylinders 46FL to 46RR is constituted by, for example, a cylinder, a piston, a pad, a disc rotor (none are illustrated), and the like. The piston is propelled by hydraulic fluid supplied from the master cylinder, whereby the pad connected to the piston is pressed against the disc rotor. Incidentally, the disc rotor rotates with the wheels. Thus, a brake torque acting on the disc rotor becomes a braking force acting between the wheels and a road surface. As above, the braking force can be generated on each wheel in response to the driver's operation on the brake pedal.

Although not illustrated in FIG. 1, the brake control device 45 includes, for example, a CPU, a ROM, a RAM, and an input/output device, which is similar to the travel control device 1. For example, a sensor signal of the combine sensor 44, sensor signals of wheel speed sensors 41FL, 41FR, 41RL, and 41RR, a sensor signal from a steering wheel angle detection device 51, and a braking force command value from the travel control device 1, and the like are input to the brake control device 45.

The combine sensor 4 is a sensor that can detect a longitudinal acceleration, a lateral acceleration, and a yaw rate of the vehicle 1. The wheel speed sensors 41FL, 41FR, 41RL, and 41RR are sensors that detect the number of rotations of the wheels FL, FR, RL, and RR. The sensor signal from the steering wheel angle detection device 51 is input to the brake control device 45 via the steering control device 37 to be described later.

An output of the brake control device 45 is connected to the brake control mechanism 43 including a pump and a control valve (none are illustrated), and the brake control device 45 can generate an arbitrary braking force on each wheel independently of the driver's operation on the brake pedal.

The brake control device 45 estimates spin, drift out, wheel lock, and the like of the vehicle 3 based on information, and generates a braking force on the corresponding wheel to suppress them, thereby serving a role of enhancing steering stability of the driver.

The travel control device 1 can cause the vehicle 3 to generate an arbitrary braking force by transmitting a brake command (value) to the brake control device 45. As a result, braking can be performed automatically in automatic driving in which no operation is caused by the driver. However, the present embodiment is not limited to the brake control device. Other actuators such as brake-by-wire may be used.

Next, a steering operation of the vehicle 3 will be described. In a state where the driver is manually driving the vehicle 3, a steering torque detection device 36 and the steering wheel angle detection device 51 respectively detect a steering torque and a steering wheel angle input by the driver via the steering wheel 35. The steering control device 37 generates an assist torque by controlling a motor 38 based on the detected steering torque and steering wheel angle.

Although not illustrated in detail in FIG. 1, the steering control device 37 also includes, for example, a CPU, a ROM, a RAM, and an input/output device similarly to the travel control device 1. A resultant force of the steering torque of the driver and the assist torque generated by the motor 38 moves the steering control mechanism 40 so that a direction of the front wheels (FL and FR wheels) is controlled. On the other hand, a reaction force from a road surface is transmitted to the steering control mechanism 40 in response to a turning angle of the front wheels, and is transmitted to the driver as a road surface reaction force.

The steering control device 37 can control the steering control mechanism 40 by generating the torque by the motor 38 independently of the steering operation of the driver. Therefore, the travel control device 1 can control the front wheels to an arbitrary turning angle by transmitting a steering force command (value) to the steering control device 37. As a result, the steering control device 37 can automatically perform steering in automatic driving in which no operation is caused by the driver. However, the present embodiment is not limited to the steering control device. Other actuators such as steer-by-wire may be used.

Next, an operation of an accelerator of the vehicle 3 will be described. The amount of the accelerator pedal 47 depressed by the driver is detected by the stroke sensor 48 and is input to the acceleration control device 49. Although not illustrated in detail in FIG. 1, the acceleration control device 49 also includes, for example, a CPU, a ROM, a RAM, and an input/output device similarly to the travel control device 1. The acceleration control device 49 adjusts a throttle opening degree in response to the depression amount of the accelerator pedal 47 to control the engine. As a result, the vehicle 3 can be accelerated in response to the driver's operation on the accelerator pedal. Further, the acceleration control device 49 can control the throttle opening degree independently of the driver's operation on the accelerator. Therefore, the travel control device 1 can generate an arbitrary acceleration in the vehicle 3 by transmitting an acceleration command (value) to the acceleration control device 49. As a result, the acceleration control device 49 can automatically perform acceleration in automatic driving in which no operation is caused by the driver.

Figure 3:
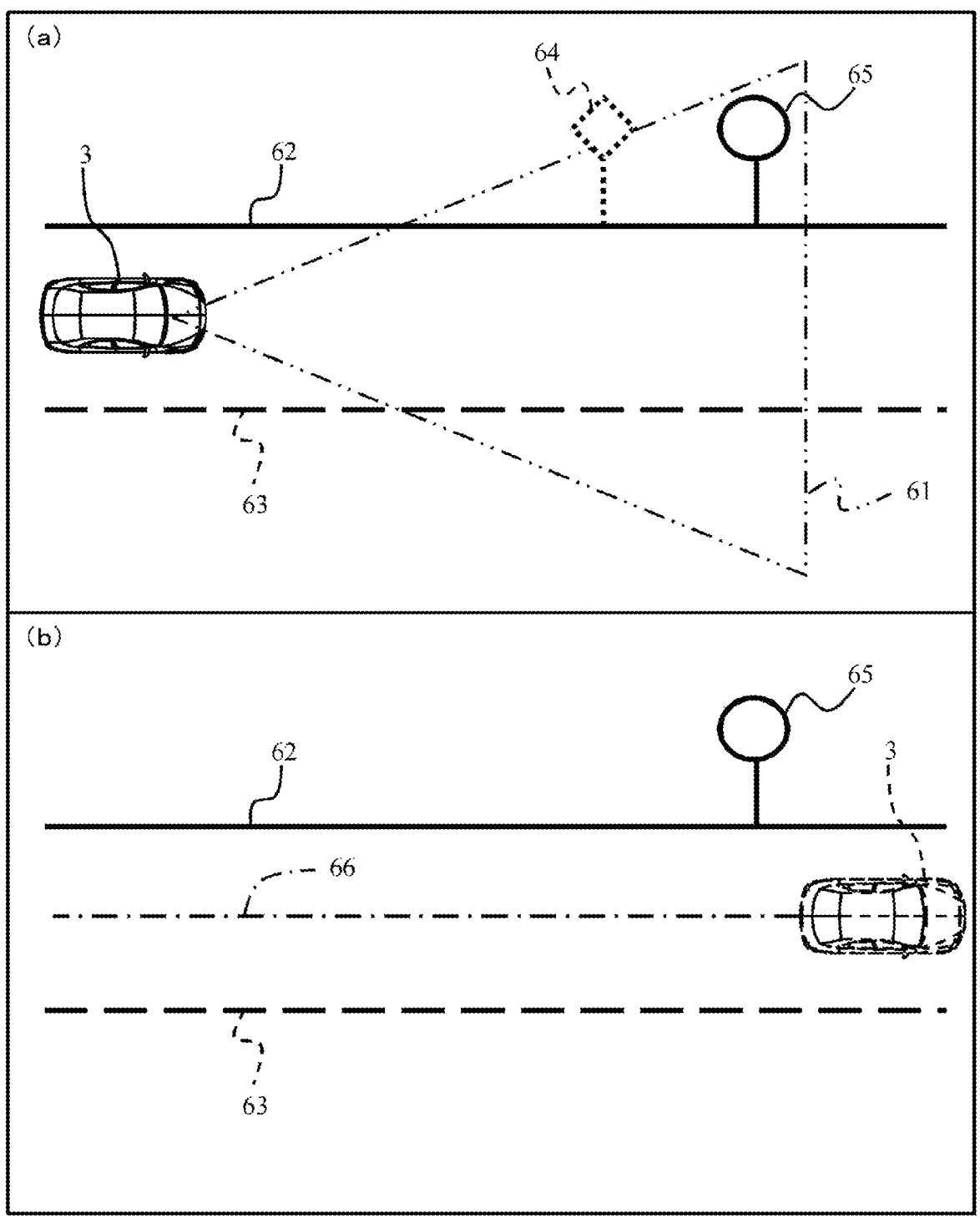
FIG. 3 is an explanatory view illustrating a method of enlarging a travelable range.

An example of an operation of the travelable-range enlargement unit 141 will be described with reference to FIGS. 3 to 5. FIG. 3(a) illustrates an example of the outside-world information 22 obtained in a certain scene at a place where the host vehicle 3 travels for the first time. In FIG. 3(a), white lines 62 and 63 and a sign 65 present in a detection range 61 of the sensor 31 are detected by the sensor 31. It is assumed that a sign 64 is also actually present as an object that may be detected by the sensor 31, but a detection algorithm of the sensor 31 has failed to detect the sign 64 for some reason.

When the outside-world information 22 of FIG. 3(a) is acquired, the travelable-range enlargement unit 141 generates the travelable range 143 as illustrated in FIG. 3(b). That is, the travelable-range enlargement unit 141 stores the solid white line 62 present on the left side in the advancing direction of the vehicle 3, the broken white line 63 present on the right side, the sign 65, and a travel trajectory 56 of the host vehicle as the travelable range 143.

FIG. 4(a) illustrates an example of the outside-world information 22 obtained when the host vehicle 3 travels the same place for the second or subsequent time. In FIG. 4(a), white lines 72 and 73 and signs 74 and 75 present in the detection range 61 of the sensor 31 are detected. Incidentally, the detection of the outside-world information 22 is not limited to the sensor 31, and the outside-world information 22 may be detected by a fusion of the sensors 31 to 34.

A current position P3a of the vehicle 3 obtained based on the vehicle information 23 is different from an actual position P3b of the vehicle 3. This is because detection accuracy of a GPS or the like configured to specify a self-position of the vehicle 3 is low. Therefore, in this case, positions of the white lines 62 and 63 and the sign 65 are referred to from information of the travelable range 143 that has been already stored, and the current position P3a of the host vehicle 3 is corrected to the actual position P3b using a landmark matching technique.

FIG. 4(b) illustrates an example of the travelable range 143 obtained after the correction of the current position of the vehicle 3. Here, the sign 64 is newly stored in addition to the information of the travelable range 143 that has been generated at the time of the previous travel, that is, the solid white line 62 present on the left side of the host vehicle 3, the broken white line 63 present on the right side, the sign 65, and the travel trajectory 56 of the host vehicle 3.

In this manner, the travelable-range enlargement unit 141 generates the travelable range 143 based on the outside-world information 22 and the vehicle information 23. The travelable-range enlargement unit 141 collates the existing information of the existing travelable range 143 with the outside-world information 22 and integrates the newly detected outside-world information while correcting the current position of the host vehicle 3.

Figure 4:
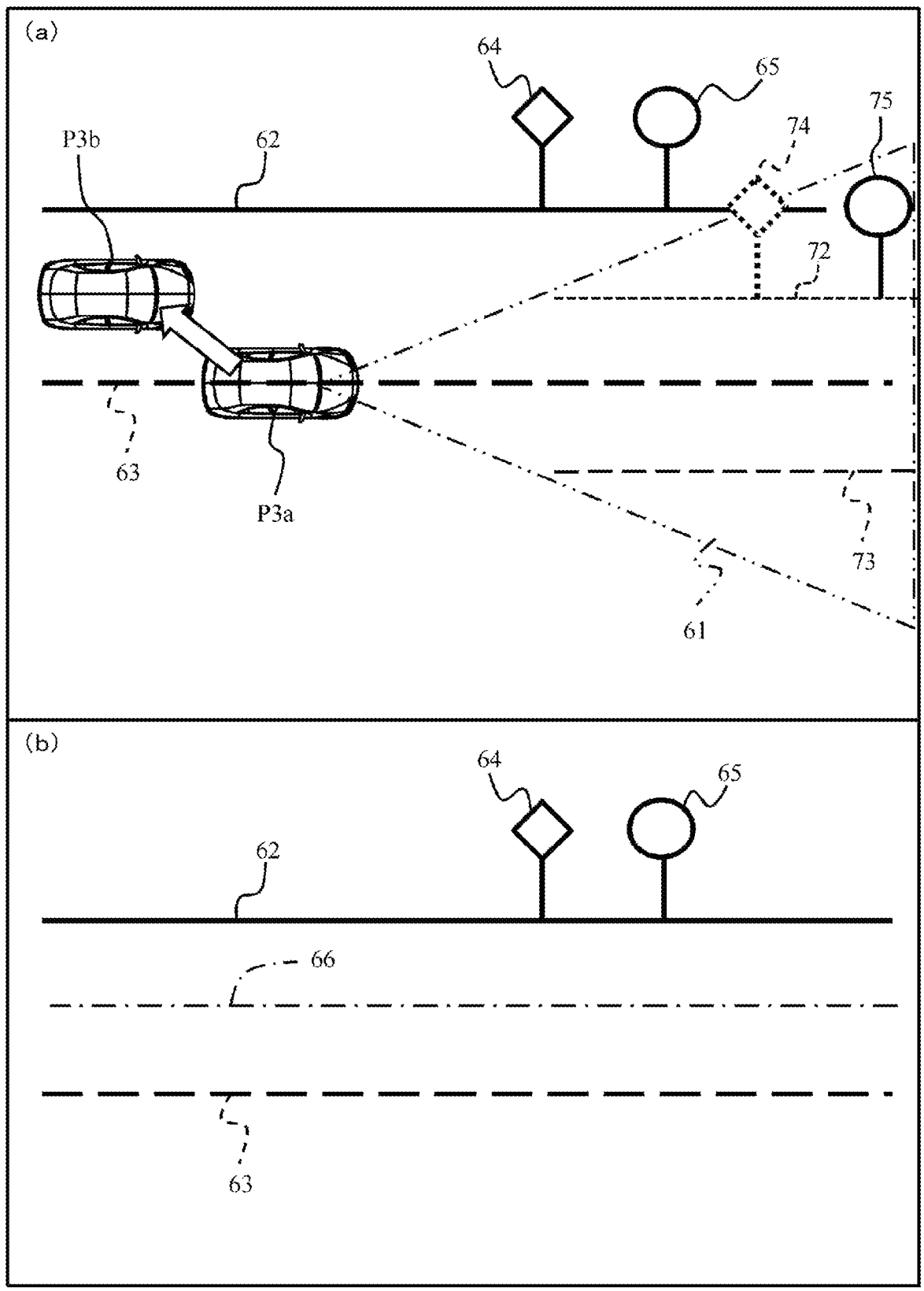
FIG. 4 is an explanatory view illustrating another method of enlarging the travelable range.

FIG. 4 illustrates the case where a relative positional relationship between the white lines 62 and 63 and the signs 64 and 65 does not change between the first travel and the second travel. In practice, however, there is a possibility that the relative positional relationship may change due to a detection error or the like of the sensors 31 to 34 mounted on the vehicle 3. A method of generating the travelable range 143 in this case will be described with reference to FIG. 5.

FIG. 5(a) illustrates an example of the outside-world information 22 obtained when the host vehicle 3 travels the same place for the second or subsequent time. The white lines 62 and 63 and the signs 65 and 74 present in the detection range 61 of the sensor 31 are detected. Among them, the sign 74 is detected at a position different from the sign 64 at the position stored in the travelable range 143.

FIG. 5(b) illustrates an example of a method of generating the travelable range 143 in the above-described situation. Here, latest outside-world information, that is, the position where the sign 74 is viewed is newly stored in the travelable range 143 as a sign 64b. That is, the latest outside-world information is stored as the travelable range 143 each time the number of times of travel is increased.

FIG. 5(c) illustrates another example of the method of generating the travelable range 143. Here, the latest outside-world information, that is, the position at which the sign 74 is viewed and the position of the sign 64 at the position stored in the travelable range 143 are comprehensively used and newly stored in the travelable range 143 as the sign 64b. That is, the outside-world information accumulated so far is integrated and stored as the travelable range 143 each time the number of times of travel is increased. For example, the integration may be performed by a method of calculating an average of the positions, calculating a position using a method such as a least-squares method of applying a weight to past outside-world information such that the latest outside-world information is reflected more, or the like.

Figure 5:
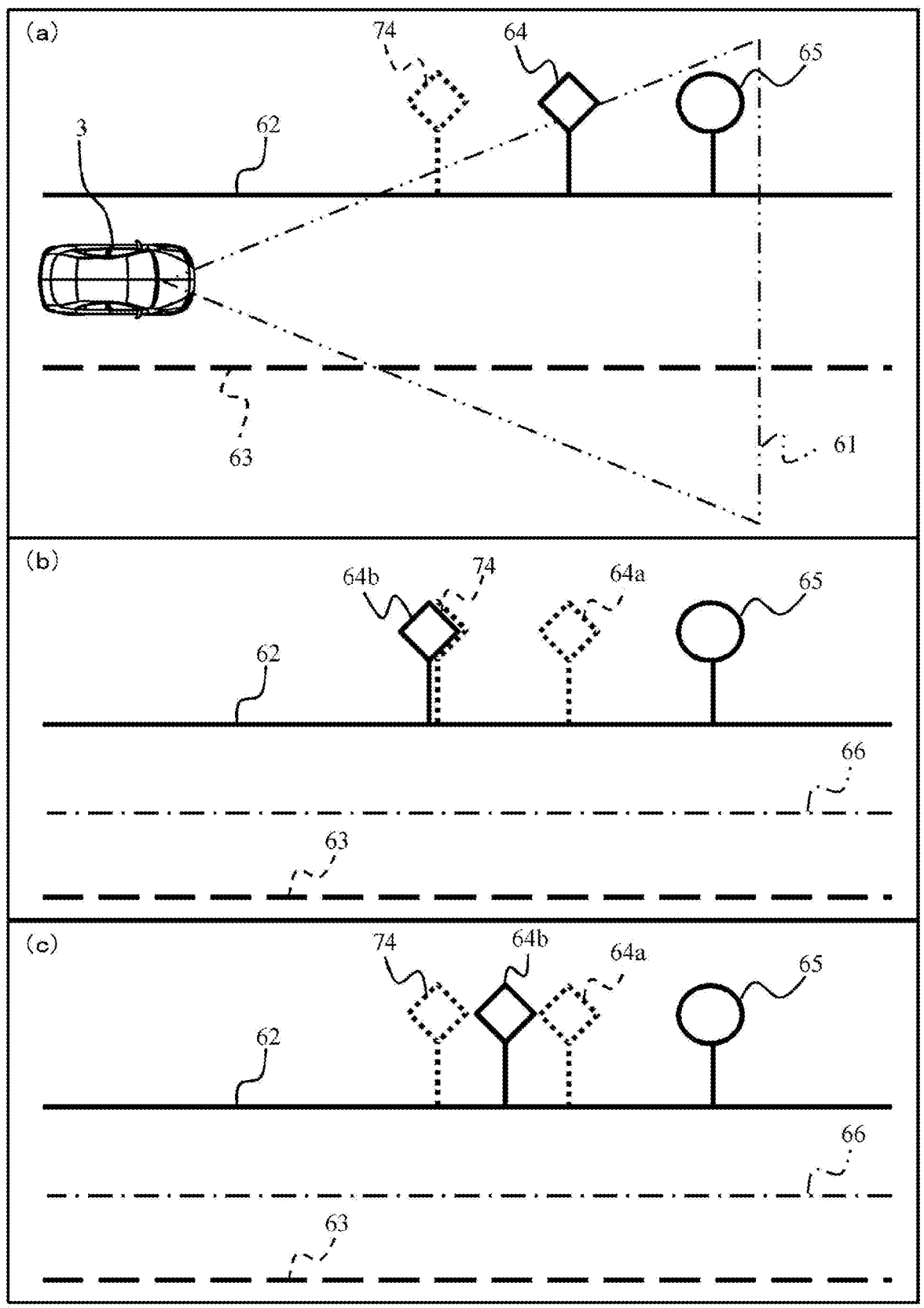
FIG. 5 is an explanatory view illustrating still another method of enlarging the travelable range.

Although FIG. 5 illustrates the case where the detection position of the sign 64 changes, the same description also applies to a case where the sign 64 is visible or invisible depending on the time of travel. That is, when the sign 64 is invisible in the latest outside-world information, the information of the sign 64 is deleted from the travelable range 143 in the method described in FIG. 5(b). On the other hand, in the method described with reference to FIG. 5(c), the outside-world information is integrated only at the time when the sign 64 is visible, and the integration result is stored in the travelable range 143.

In the course of generating the travelable range 143, a speed limit may be associated with a place and stored in the travelable range 143, for example, when the sign 65 is a speed sign and the speed limit can be detected. Alternatively, the speed limit may be set by the operation from the driver if the sign is not present or is not detectable. The information on the speed limit can be used as an upper limit speed at the time of creating a speed plan in travel control.

Figure 6:
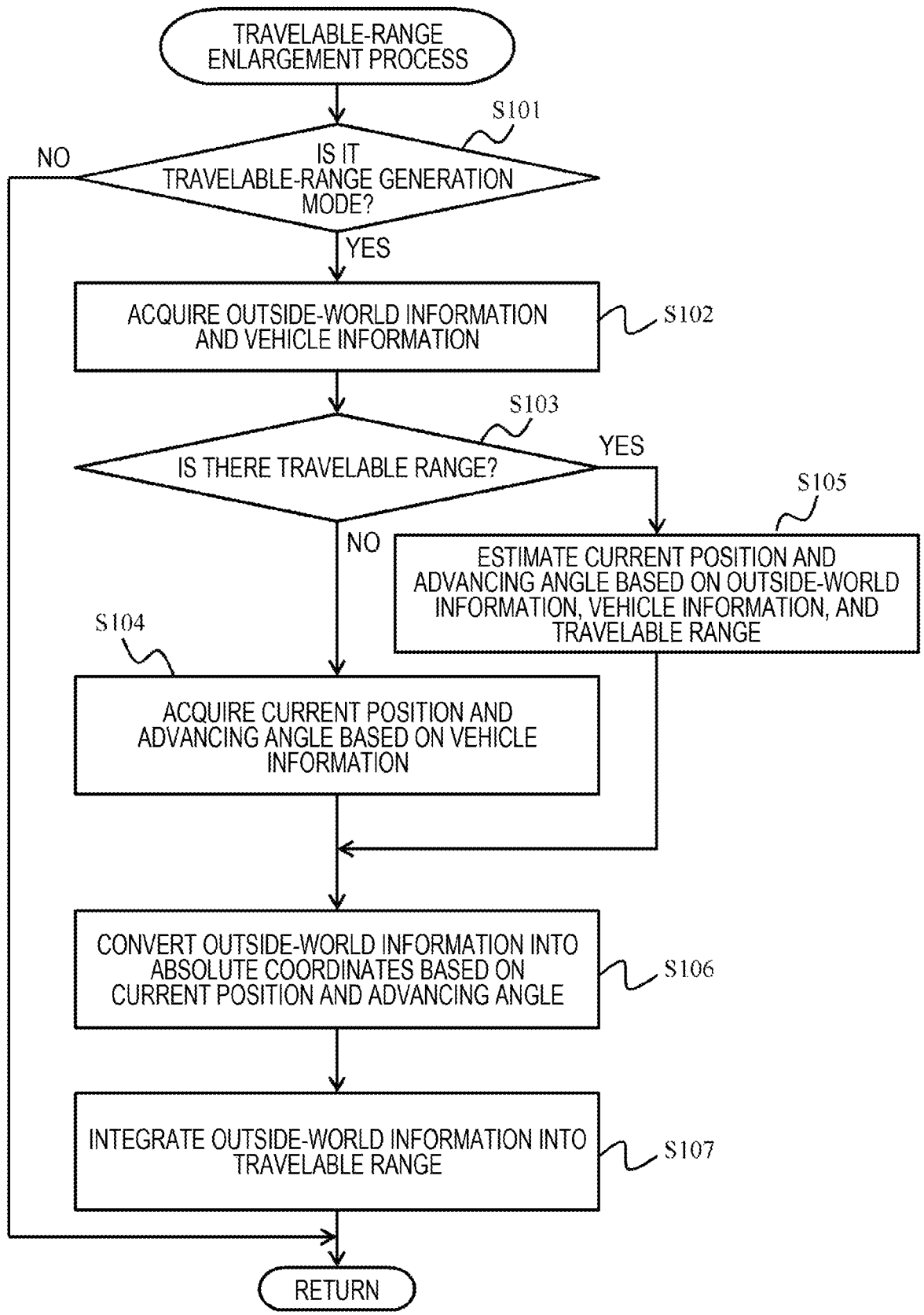
FIG. 6 is a flowchart illustrating a process of enlarging the travelable range.

FIG. 6 is a flowchart for describing a process in the travelable-range enlargement unit 141. In this flow, it is determined in each calculation step whether a travelable-range generation mode is set, and outside-world information such as an obstacle, a landmark, and a white line on a road surface is converted into absolute coordinates on the basis of the ground and is integrated into the travelable range 143 when travelable-range generation mode is set.

The travelable-range enlargement unit 141 determines whether the travelable-range generation mode is set (S101). As described later, the driver can select a desired mode from among a plurality of modes prepared in advance. Alternatively, it can be configured such that a predetermined mode is automatically selected from among the plurality of modes depending on a state of the vehicle 3 or the like.

When the travelable-range generation mode is not set (S101: NO), the travelable-range enlargement unit 141 returns without any operation. On the other hand, the travelable-range enlargement unit 141 acquires the outside-world information 22 and the vehicle information 23 when the travelable-range generation mode is set (S101: YES) (S102).

The travelable-range enlargement unit 141 determines whether the travelable range 143 relating to a place currently being traveled already exists (S103). When the travelable range 143 does not exist (S103: NO), that is, when the current travel is the first travel at the place, the travelable-range enlargement unit 141 acquires a current position and an advancing angle of the host vehicle 3 from the vehicle information acquiring unit 13 (S104).

When the travelable range 143 exists (S103: YES), that is, when the current travel is the second or subsequent travel at the same place, the travelable-range enlargement unit 141 estimates a position and a direction of the host vehicle 3 using the outside-world information, the vehicle information, and the travelable range (S105).

The travelable-range enlargement unit 141 uses the acquired or estimated current position and advancing angle to convert outside-world information such as an obstacle, a landmark, and a white line on a road surface into absolute coordinates on the basis of the ground (S106). The travelable-range enlargement unit 141 integrates the outside-world information that has been converted into the absolute coordinates into the travelable range 143 (S107).

The process executed by the travelable-range enlargement unit 141 has been described as above. Although FIG. 6 illustrates the case where the travelable range is generated when the travelable-range generation mode is selected, but the invention is not limited thereto, and the travelable range may be generated regardless of the presence or absence of the travelable-range generation mode.

The description has been given assuming the case where the driver operates the steering wheel 35, the accelerator 47, and the brake 42 to perform the manual driving in the process of FIG. 6. Instead, automatic traveling may be performed based on an operation using, for example, a joystick, a controller, a head-mounted operating device, or the like. Alternatively, a specific travel pattern may be stored in advance, and automatic traveling may be performed based on the travel pattern.

Further, in Step S105, when there is no travelable range, a navigation map may be acquired from a map server using communication or the like and a current position and an advancing angle of the host vehicle 3 may be estimated based on the navigation map and the vehicle information 23.

The travelable-range evaluation unit 142 executes partial or whole travel control based on the travelable range 143, and determines whether a predetermined condition is satisfied based on at least one of the operation 21, the outside-world information 22, and the vehicle information 23 at that time.

When the predetermined condition is satisfied, the travelable-range evaluation unit 142 recognizes the current position of the host vehicle 3 satisfying the predetermined condition as a travel-controllable place and stores the travel-controllable place in the travelable range 143.

Figure 7:
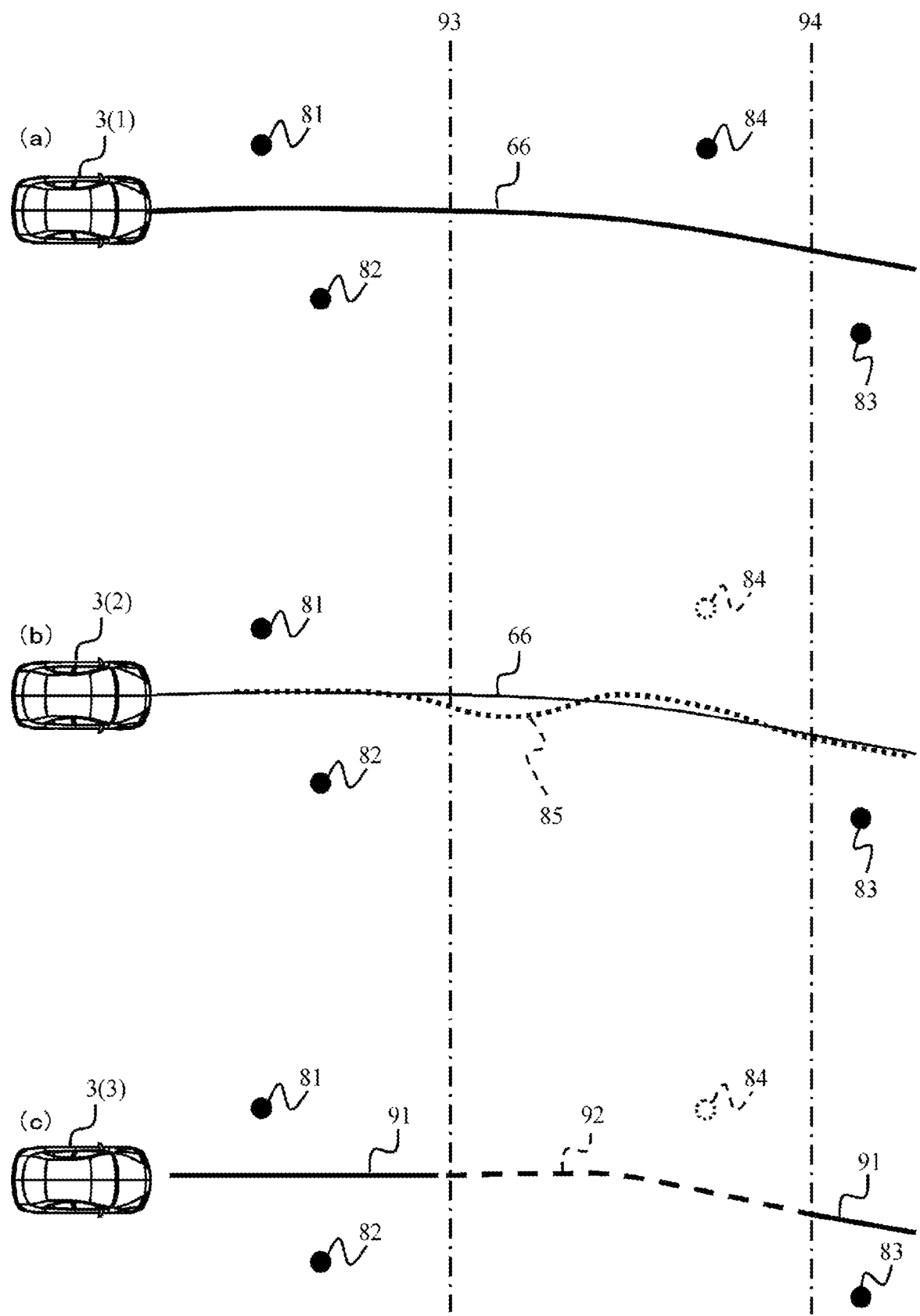
FIG. 7 is an explanatory view illustrating a method of evaluating a travelable range.

An example of a process in the travelable-range evaluation unit 142 will be described with reference to FIGS. 7 to 9. FIG. 7(a) illustrates an example of the outside-world information 22 obtained in a certain scene at a place where the host vehicle 3 travels for a certain time of the second and subsequent times. Here, objects 81 to 84 present in the periphery of the host vehicle 3 are detected by the sensors 31 to 34. In this case, the objects 81 to and a travel trajectory 66 of the host vehicle 3 are stored in the travelable range 143.

FIG. 7(b) illustrates a behavior of the vehicle 3 when the travelable-range evaluation unit 142 performs travel control based on the travelable range 143 as an evaluation target. As an example of the outside-world information 22, it is assumed that the sensor has failed to detect the object 84 among the objects present in the periphery of the host vehicle 3. A broken line 85 represents a travel trajectory of the host vehicle 3 at this time. In a section between one-dot chain lines 93 and 94, a lateral wobble, caused by the failure in detection of the object 84, occurs, and there is a stop deviating from the travel trajectory 66 stored in the travelable range 143.

An example of a method of determining the "wobble" at this time will be described. The vehicle information 23 (a steering angle, a longitudinal acceleration, a lateral acceleration, a yaw rate, a yaw angle, and the like) at the time of manual travel illustrated in FIG. 7(a) is acquired and stored in the travelable range 143 as past travel information. Then, it is determined whether a deviation between the stored vehicle information and the vehicle information at the time of travel control illustrated in FIG. 7(b) is equal to or larger than a predetermined value, and it is determined that "travel control is not possible" for a region in which the deviation equal to or larger than the predetermined value has occurred.

Alternatively, an average and a variance of the stored vehicle information in a certain time interval may be calculated, and a region in which a variance value of at least one vehicle information is equal to or larger than a predetermined value may be determined as that "travel control is not possible".

A predetermined value used at the time of determining the possibility of travel control may be set, for example, on the basis of a driving behavior of a skilled driver who is considered to cause a little "wobble", or may be set in the form of causing the driver to select a value of "the degree of wobble that is allowable" in advance.

FIG. 7(c) illustrates an example of a determination result of the travel control possibility of each region in the travelable range 143 based on the vehicle information and outside-world information illustrated in FIG. 7(b). A solid line 91 indicates that travel control is possible, and a broken line 92 indicates that travel control is not possible. In FIG. 7(c), it is determined that travel control is not yet possible in the section between one-dot chain lines 93 and 94 in which a wobble has occurred when travel control based on travelable-range evaluation unit 142 is performed. In this manner, the travelable range 143 can be divided into a plurality of regions, and the determination result on whether travel control is possible can be associated and managed for each of the regions.

As a method of determining the possibility of whether the travel control is possible, an element other than the "wobble" may be used. For example, in the example of FIG. 7, there are a travel time (FIG. 7(a)) in which the object has been successfully detected by the sensor and a travel time (FIG. 7(b)) in which the sensor has failed to detect the object 84. In this case, in the travelable range 143, information (a flag, an existence probability value, or the like) indicating "uncertain" may be added to the object 84. It is also possible to determine a region in which a large number of such "uncertain" objects exist as that "travel control is not possible". Hereinafter, the possibility determination on whether travel control is possible may be referred to as travel control possibility determination. The fact that travel control is possible means that automatic driving is possible.

Although the travel control possibility determination of the travelable range 143 based on the outside-world information 22 and the vehicle information 23 has been described in FIG. 7, the travel control possibility determination based on the operation 21 may be performed.

An example of the travel control possibility determination based on the operation 21 will be described with reference to FIG. 8. FIG. 8(a) illustrates an example of the travelable range 143 stored as the host vehicle 3 has traveled several times. The objects 81 to 84 and the travel trajectory 66 of the host vehicle 3 are stored in the travelable range 143.

In FIG. 8(a), a broken line 95 represents a vehicle trajectory obtained when the travelable-range evaluation unit 142 has performed travel control for the travelable range 143 as the evaluation target. In the case of FIG. 8(a), it is assumed that an error occurs in the self-position estimation of the host vehicle 3 because the sensor has failed to detect the object 84 stored in the travelable range 143. Thus, the trajectory 85 of the travel control for evaluation deviates from the travel trajectory 66 stored in the travelable range 143.

FIG. 8(b) illustrates a value of a steering angle at each position as an example of the operation 21 in the case of FIG. 8(a). A broken line 95 indicates a steering angle calculated by travel control, and a solid line 96 indicates an actual steering angle. The driver has felt dangerous and overridden steering, and thus, travel control is interrupted and manual travel is performed between one-dot chain lines 93 and 94. Therefore, the broken line 95 indicating the steering angle during the travel control based on the travelable range 143 and the solid line 96 indicating the steering angle during actual travel are different from each other.

FIG. 8(c) illustrates an example of the travel control possibility determination for each region in the travelable range 143 based on the operation 21 (here, the steering angle) illustrated in FIG. 8(b). A solid line 91 indicates that travel control is possible, and a broken line 92 indicates that travel control is not possible. When travel control based on the travelable-range evaluation unit 142 is performed, it is determined that travel control is not possible between one-dot chain lines 93 and 94 where the operation by the driver has occurred. In this manner, it is possible to determine that "the travel control is not possible" when the operation 21 performed by the driver is input during the travel control, that is, for the overridden region.

Figure 8:
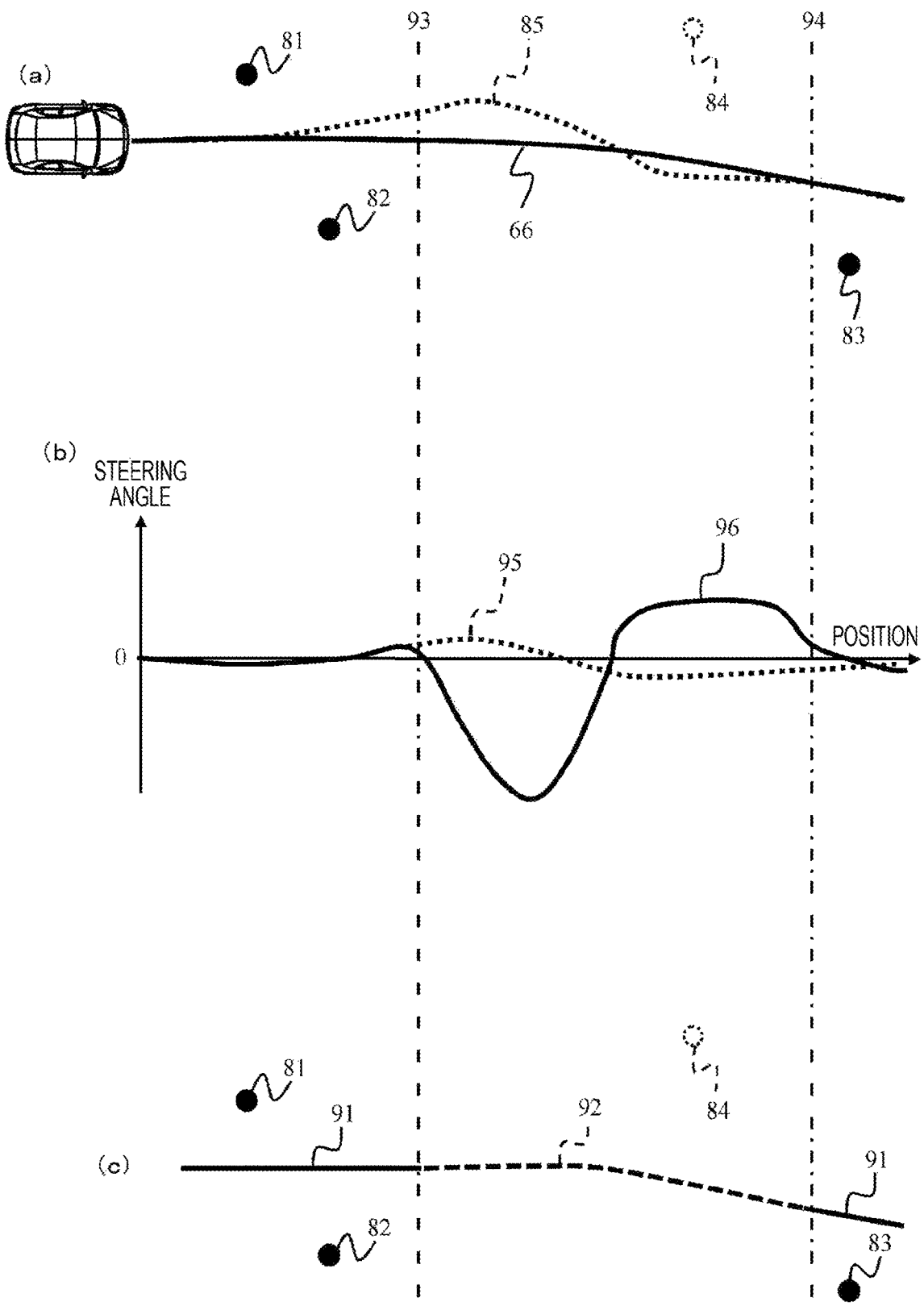
FIG. 8 is an explanatory view illustrating another method of evaluating the travelable range.

In FIG. 8, the case of determining the possibility of the travel control by determining the "wobble" based on the outside-world information 22 and the vehicle information 23 has been further described. However, there is a possibility of a wobble depending on a driving skill of the driver even at the time of manual driving by the driver. Therefore, in a region where there is no map information, it is necessary to determine whether the obtained travel trajectory reflects the wobble caused by the driver or a road shape itself that is actually curved.

One example of the determination method will be described with reference to FIG. 9. FIG. 9(a) illustrates a case where the travel trajectories 66 obtained when the travel by the driver has been performed a plurality of times wobble randomly. By statistically integrating the travel trajectories 66, a straight travel track 91 as indicated by a solid line 91 is obtained, and the travel track 91 is stored as a travelable range.

Meanwhile, in FIG. 9(b), the travel trajectory 66 obtained when the travel by the driver has been performed a plurality of times wobble similarly. However, appearances of the wobbles are almost constant in each travel. Even in this case, it is possible to obtain a curved travel trajectory as indicated by the solid line 91 by statistically integrating the travel trajectories 66, which is similar to the description in FIG. 9(a). The curved travel trajectory can be stored as a travelable region.

As the plurality of travel trajectories are integrated in this manner, it is possible to suppress the wobble during manual driving performed by the driver and to store the appropriate travel trajectory as the travelable range 143.

Figure 10:
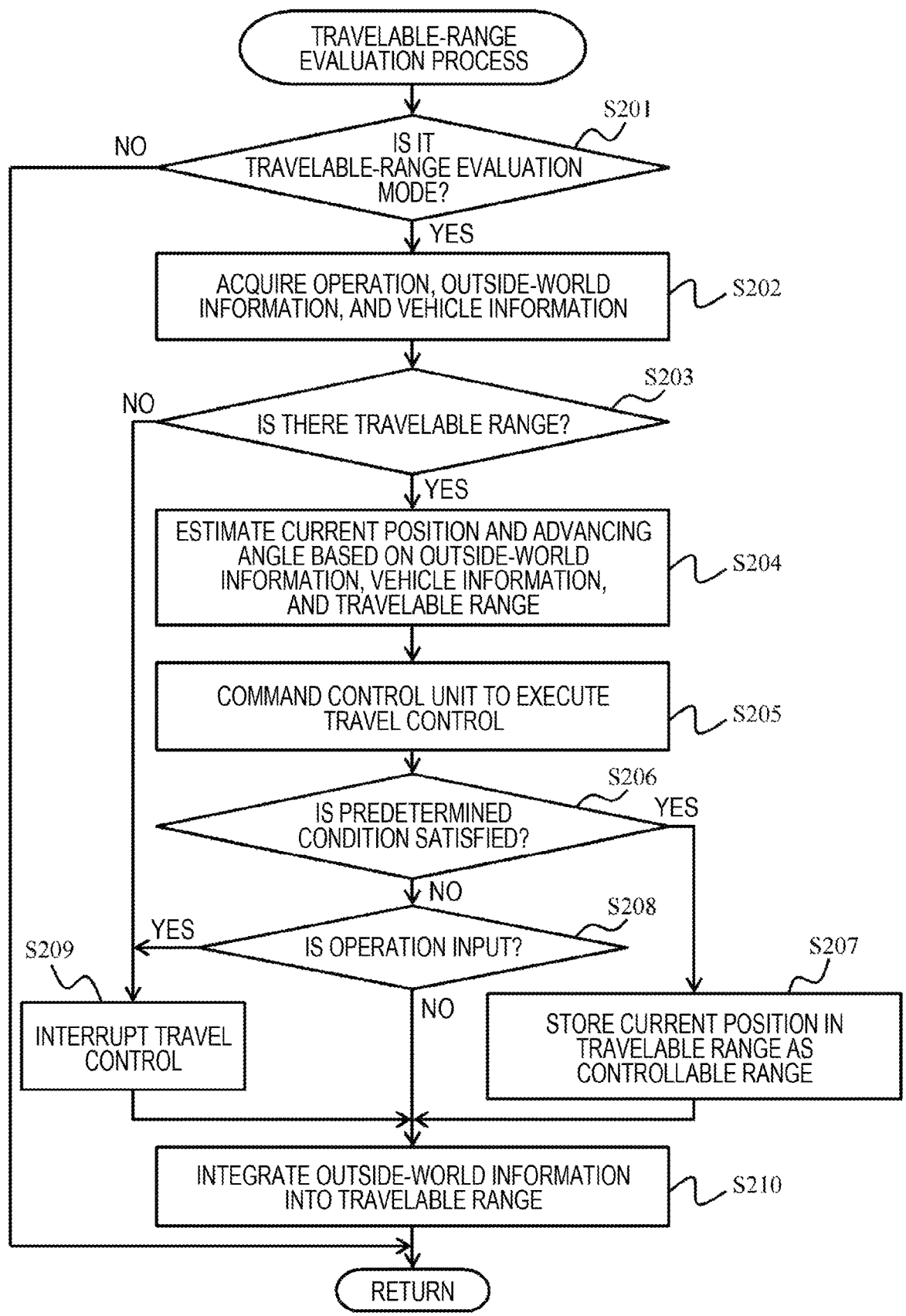
FIG. 10 is a flowchart illustrating a process of evaluating the travelable range.

FIG. 10 is a flowchart illustrating a process performed by the travelable-range evaluation unit 142. In this process, it is determined in each calculation step whether a travelable-range evaluation mode is set, and travel control is performed using at least one of the operation 21, the outside-world information 22, and the vehicle information 23 based on the current travelable range 143 when the travelable-range evaluation mode is set. Then, at least one of the operation 21 and the vehicle information 23 is used to determine whether travel control based on the travelable range 143 is possible, and the determination result is stored in the travelable range 143.

First, the travelable-range evaluation unit 142 determines whether the travelable-range evaluation mode is set (S201). When the travelable-range evaluation mode is not set (S201: NO), the travelable-range evaluation unit 142 returns without any operation. When the travelable-range evaluation mode is set (S201: YES), the travelable-range evaluation unit 142 acquires the operation 21, the outside-world information 22, and the vehicle information 23 (S202).

The travelable-range evaluation unit 142 determines whether the travelable range 143 relating to a place currently being traveled already exists (S203). When the travelable range 143 does not exist (S203: NO), that is, when the current travel is the first travel at that place, neither evaluating the travelable range nor performing travel control is possible, and thus, the travel control is interrupted (S209).

When the travelable range 143 exists (S203: YES), that is, when the current travel is the second or subsequent travel at that place, a current position and an advancing angle of the host vehicle 3 are estimated using the outside-world information 22, the vehicle information 23, and the travelable range 143 (S204). The travelable-range evaluation unit 142 calculates a command value for travel control based on the outside-world information 22, the vehicle information 23, and the travelable range 143 and commands the travel control to the control unit 15 (S205).

The travelable-range evaluation unit 142 determines whether the operation 21, the outside-world information 22, and the vehicle information 23 obtained when the travel control has been performed satisfy predetermined conditions, that is, whether the travel control is possible (S206).

Figure 9:
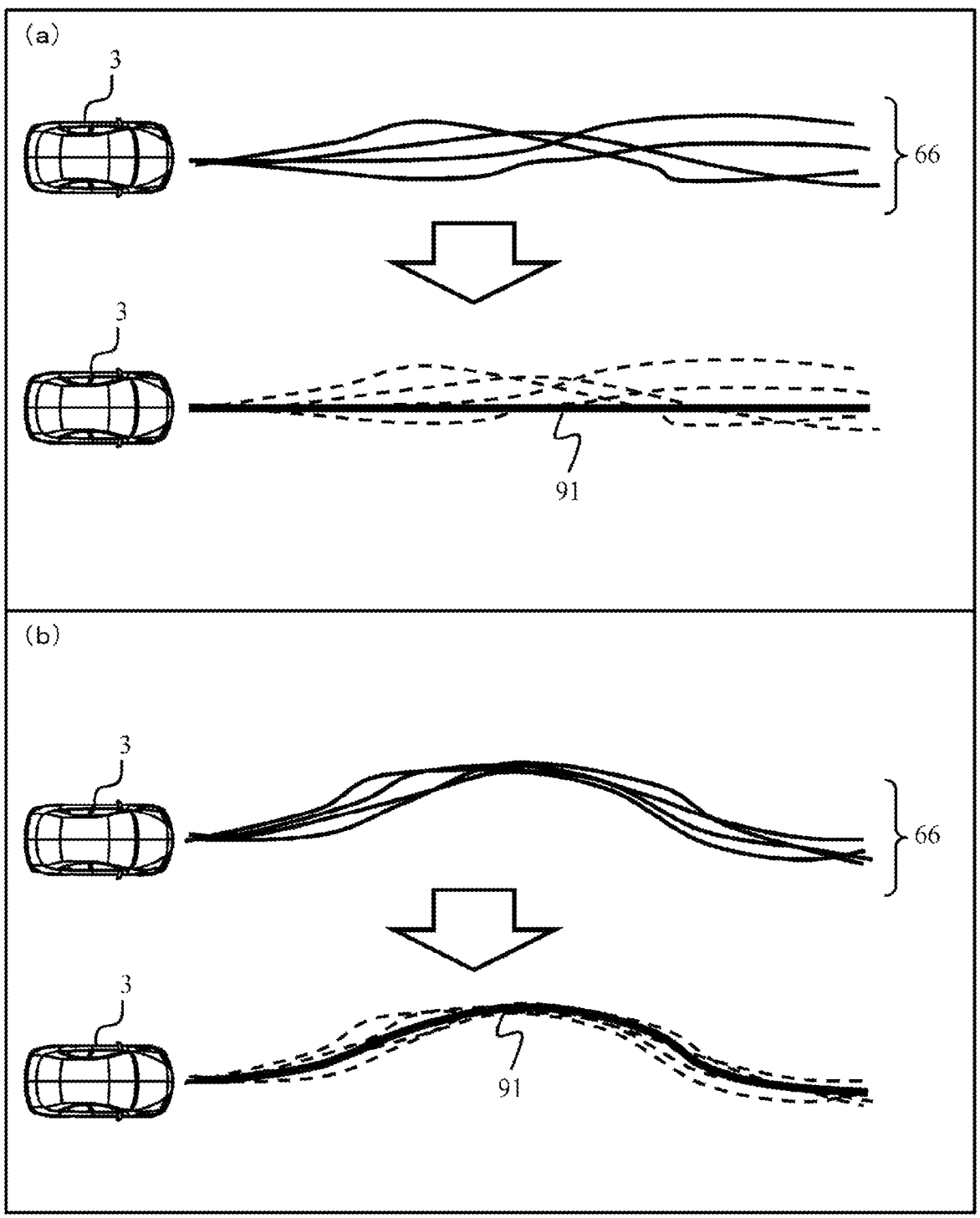
FIG. 9 is an explanatory view illustrating still another method of evaluating the travelable range.

An example of a method of the determination is the method described in FIGS. 8 and 9. When the travelable-range evaluation unit 142 determines that the travel control is possible (S206: YES), the current position is stored in the travelable range 143 as that travel control is possible (S207).

On the other hand, when it is determined that travel control is not possible (S206: NO), the above operation is not performed, and it is determined whether the operation is input (S208). When the operation has been input (S208: YES), it is determined that the driver has made an override, and the travel control is interrupted (S209). On the other hand, the travel control is continued when there is no operation (S208: NO).

Finally, outside-world information such as an obstacle, a landmark, and a white line on a road surface is converted into absolute coordinates on the basis of the ground using the current position and the advancing angle estimated during the travelable-range evaluation, and these pieces of the outside-world information are integrated into the travelable range 143 (S210). However, this Step S210 may be omitted.

As described above, the travelable-range evaluation unit 142 performs travel control on the travelable range 143 as the evaluation target to determine whether travel control is possible, and stores the evaluation target as the travelable range 143 when the travel control is possible.

The travelable-range evaluation unit 142 may be configured to request the driver to perform manual travel, and the possibility of the travel control may be determined based on a divergence degree between a travel control command value calculated by the travelable-range evaluation unit 142 and the actual operation 21 performed by the driver.

The control unit 15 calculates a travel plan using at least one of the operation 21, the outside-world information 22, the vehicle information 23, and the travelable range 143, and determines an operation of the vehicle 3 based on the travel plan. Then, the control unit 15 calculates control command values of the respective actuators mounted on the vehicle 3 in order to realize the determined operation.

When the travel control device 1 is configured to directly control the respective actuators, the travel control device 1 calculates physical quantities for operating the respective actuators. For example, in the case of a system that automatically controls a distance between vehicles, an acceleration command value of a vehicle is calculated in accordance with setting of a distance with respect to a preceding vehicle and setting of the maximum speed, and the like, and an engine throttle and a brake pressure are controlled to realize the acceleration command value. Incidentally, when there is a command of travel control from the traveling travelable-range evaluation unit 142, the travel control is executed based on the command. When the present embodiment is applied to an automatic driving system, the travel plan is an orbit and a speed at which the host vehicle 3 is to travel. The travel control device 1 calculates a steering angle command value and an acceleration command value of the vehicle for satisfying the travel plan.

Figure 11:
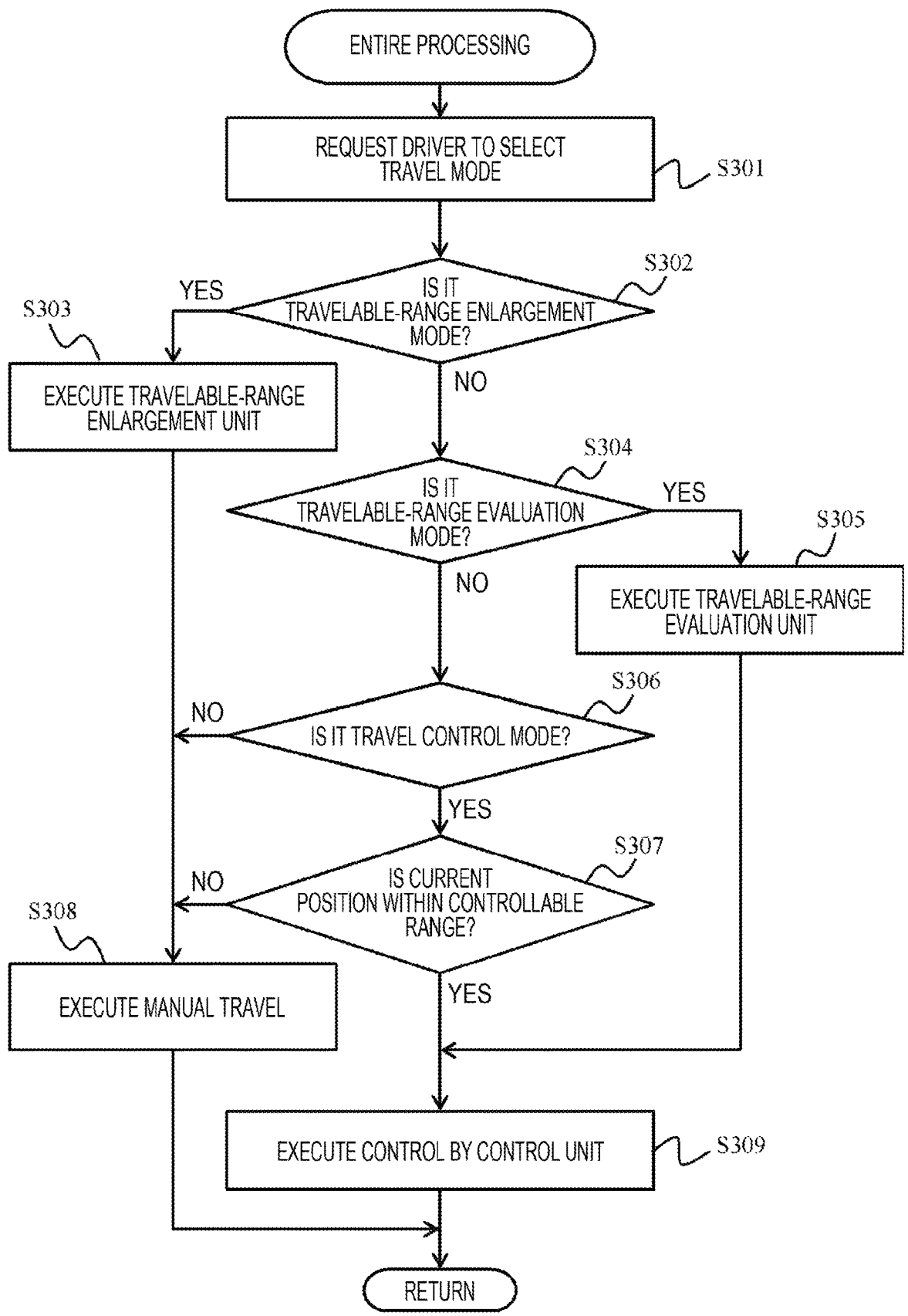
FIG. 11 is a flowchart illustrating an entire process of the travel control device.

FIG. 11 is a flowchart illustrating the entire process of the travel control device 1. In this flow, the driver is requested to select a travel mode, travel control is performed in accordance with the selected mode, or manual driving is performed by the driver's operation.

First, the travel control device 1 requests the driver to select any one mode from among a plurality of modes prepared in advance through the UI unit 54 (S301). Here, it is assumed that the driver can select one of the travelable-range enlargement mode, the travelable-range evaluation mode, and a travel control mode.

When the travelable-range enlargement mode is selected (S302: YES), the travel control device 1 executes the process in the travelable-range enlargement unit 141 as described with reference to FIG. 6 (S303). In this case, the manual travel by the driver is performed (S308).

When the travelable-range enlargement mode is not selected (S302: NO) but the travelable-range evaluation mode is selected (S304: YES), the travel control device 1 executes the travelable-range evaluation unit 142 as described in FIG. 10 (S305). In this case, the travel control by the control unit 15 is performed (S309).

When the travelable-range evaluation mode is not set (S304: NO) but the travel control mode (a driving assistance mode, an automatic driving mode, and the like) is selected (S306: YES), the travel control device 1 determines whether travel control is possible (it is within a travelable range) at a current position (S307).

When the current position of the host vehicle 3 is within the travelable range (S307: YES), the travel control device 1 performs the travel control by the control unit 15 in accordance with the selection of the driver (S309). On the other hand, when the current position of the host vehicle 3 is not within the travelable range (S307: NO) or when no traveling mode is selected (S306: NO), the manual travel by the driver is performed in the same manner as in a normal vehicle (S308).

Figure 12:
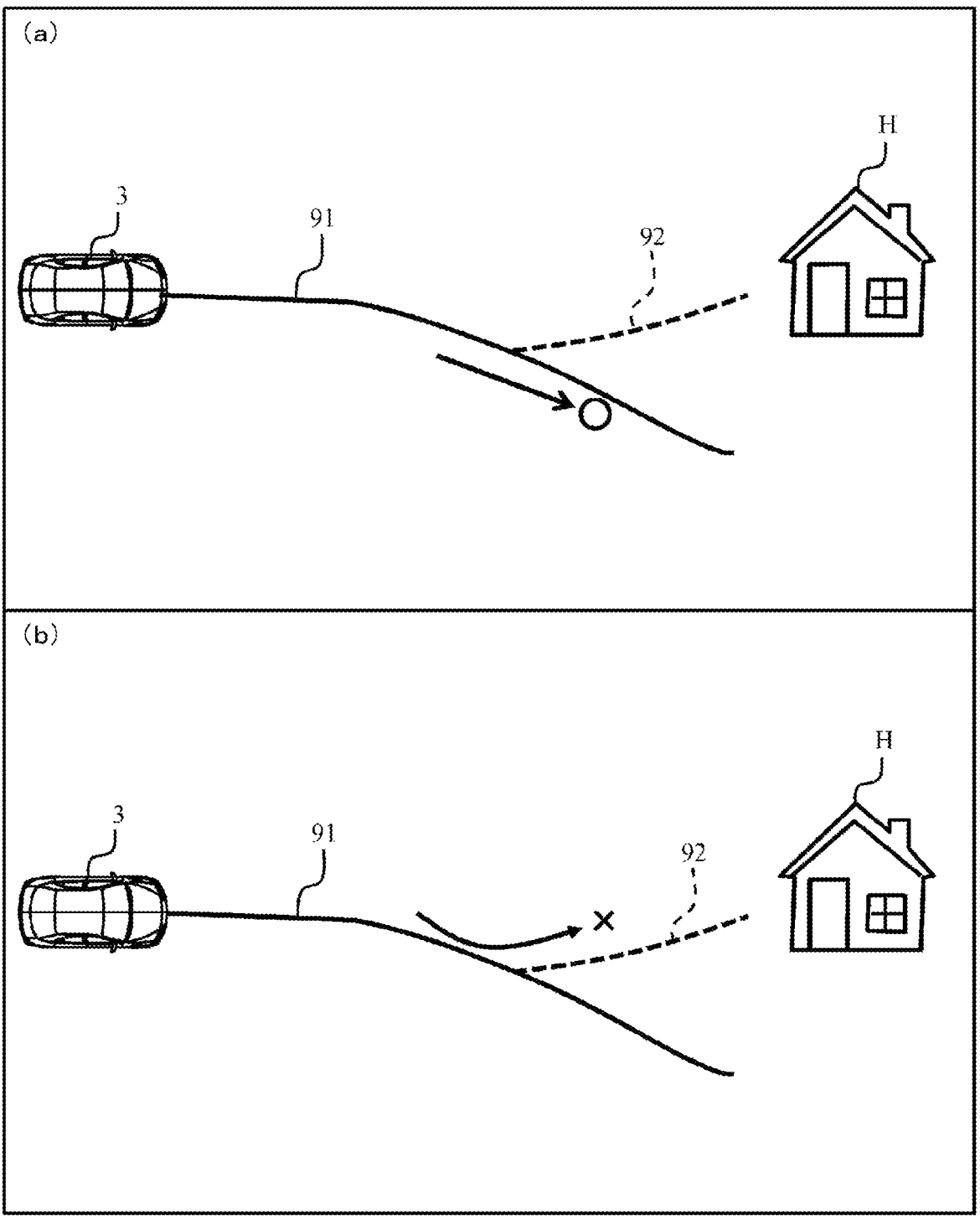
FIG. 12 is an explanatory view illustrating travel control of a comparative example of travel control.

An effect of the present embodiment will be described with reference to FIGS. 12 and 13. FIG. 12 illustrates an effect of a comparative example to be compared with the present example. Here, illustrated is an example of a case in which automatic driving of a car is performed as travel control and the travelable range 143 is a "map for automatic driving".

As illustrated to FIG. 12(a), travel control is possible in the host vehicle 3 in a region 91 where the map for automatic driving exists. As illustrated in FIG. 12(b), however, it is difficult to perform the travel control in a region 92 where the map for automatic driving does not exist, and thus, manual travel is performed by the driver.

For example, the map for automatic driving as an example of the "travelable range" is first prepared from major roads such as expressways and highways, and it is predicted that a narrow alley in front of home H of a user, a private road, and the like are delayed. Therefore, it is difficult to perform the automatic driving up to the front of the home, and the driver needs to switch to the manual driving halfway in the comparative example as illustrated in FIG. 12(b), which is less convenient.

Figure 13:
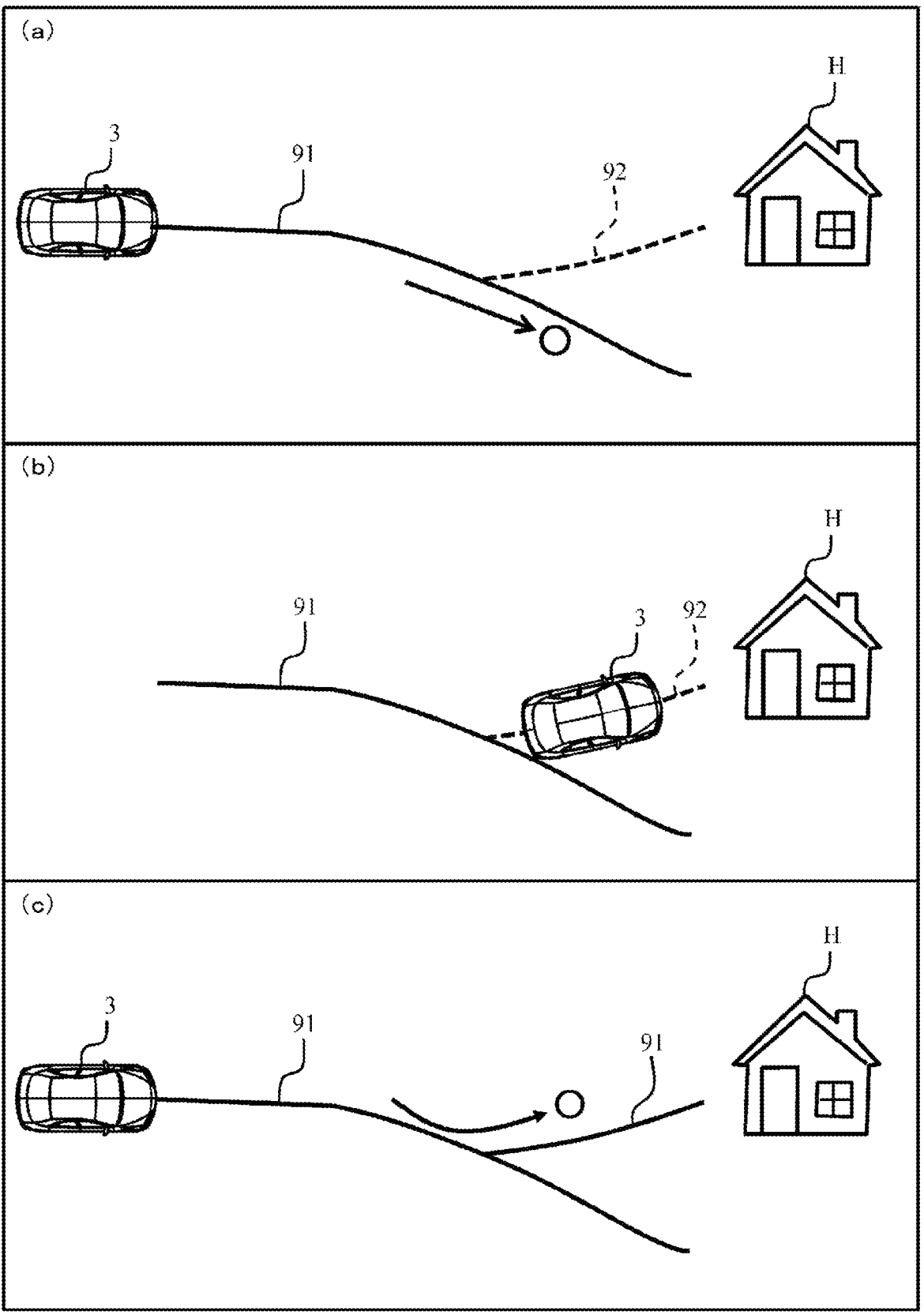
FIG. 13 is an explanatory view illustrating travel control according to the present embodiment.

FIG. 13 is an explanatory view illustrating the effect of the present embodiment. Similarly to FIG. 12(a), the travel control of the host vehicle 3 is possible in the region 91 where the map for automatic driving exists in FIG. 13(a) and this point is the same as that of the comparative example. FIG. 13(b) illustrates a state where a travelable range enlargement process and a travelable-range evaluation process are performed in the region 92 where the map for automatic driving does not exist. The travelable range in the region 92 can be enlarged by executing the processes (FIGS. 6, 10, 11) characteristic of the present embodiment. As a result, the region 92 which is not a target of travel control changes to the travel-controllable region 91 as illustrated in FIG. 13(c). As a result, the driver can continue the automatic driving up to the front of the home H of the user so that the usability is improved.

In this manner, according to the travel control device 1 of the present embodiment, the travelable range 143 can be enlarged at any place required by the user (driver) by providing the travelable-range enlargement unit 141 and the travelable-range evaluation unit 142. Further, in the present embodiment, it is possible to provide the travel control device that determines whether the generated travelable range has sufficient information for the vehicle travel control and automatic driving and realizes more stable travel control in the region determined as travelable.

Second Embodiment

Figure 15:
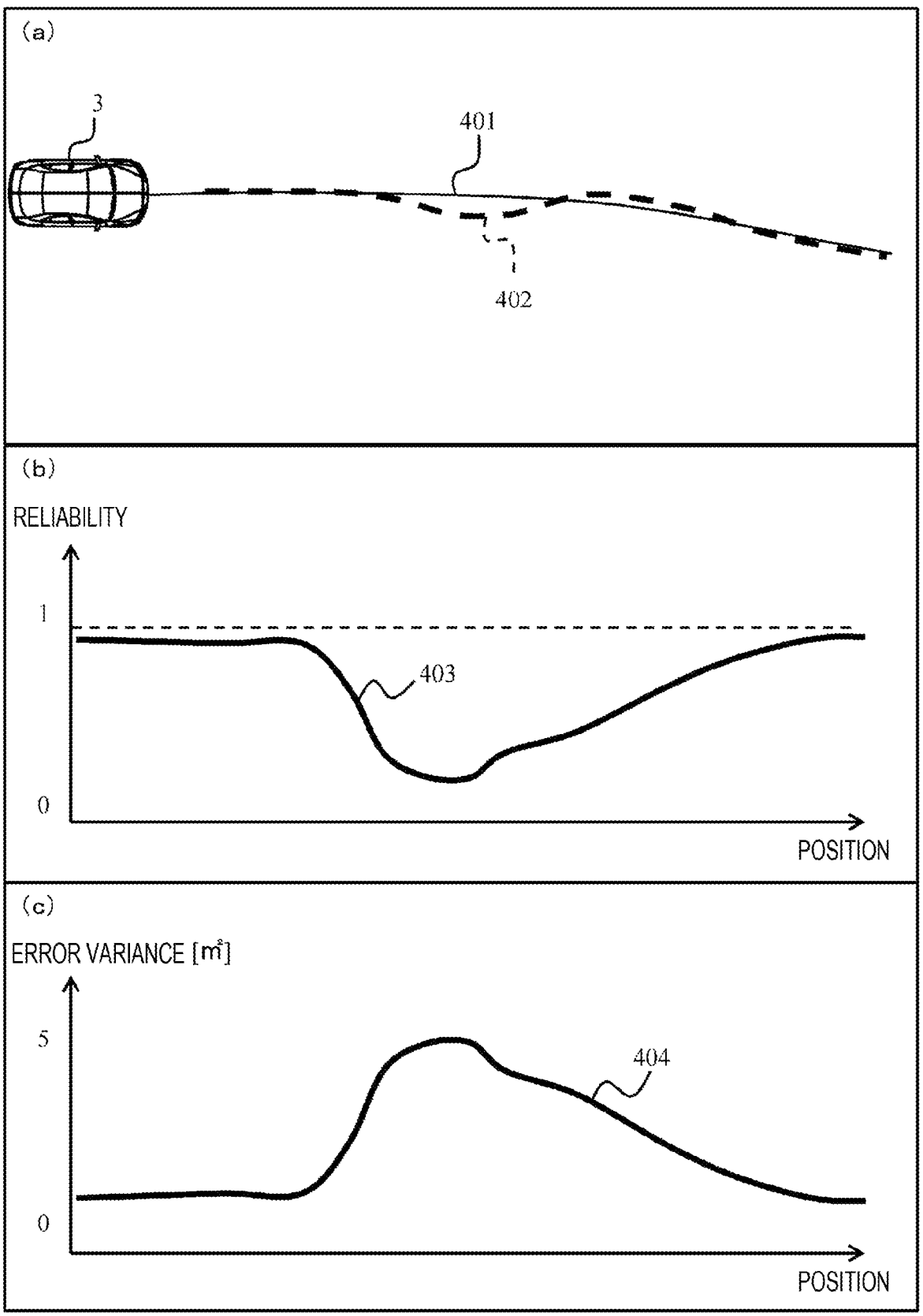
FIG. 15 is an explanatory view illustrating a method of determining reliability of input information.
Figure 16:
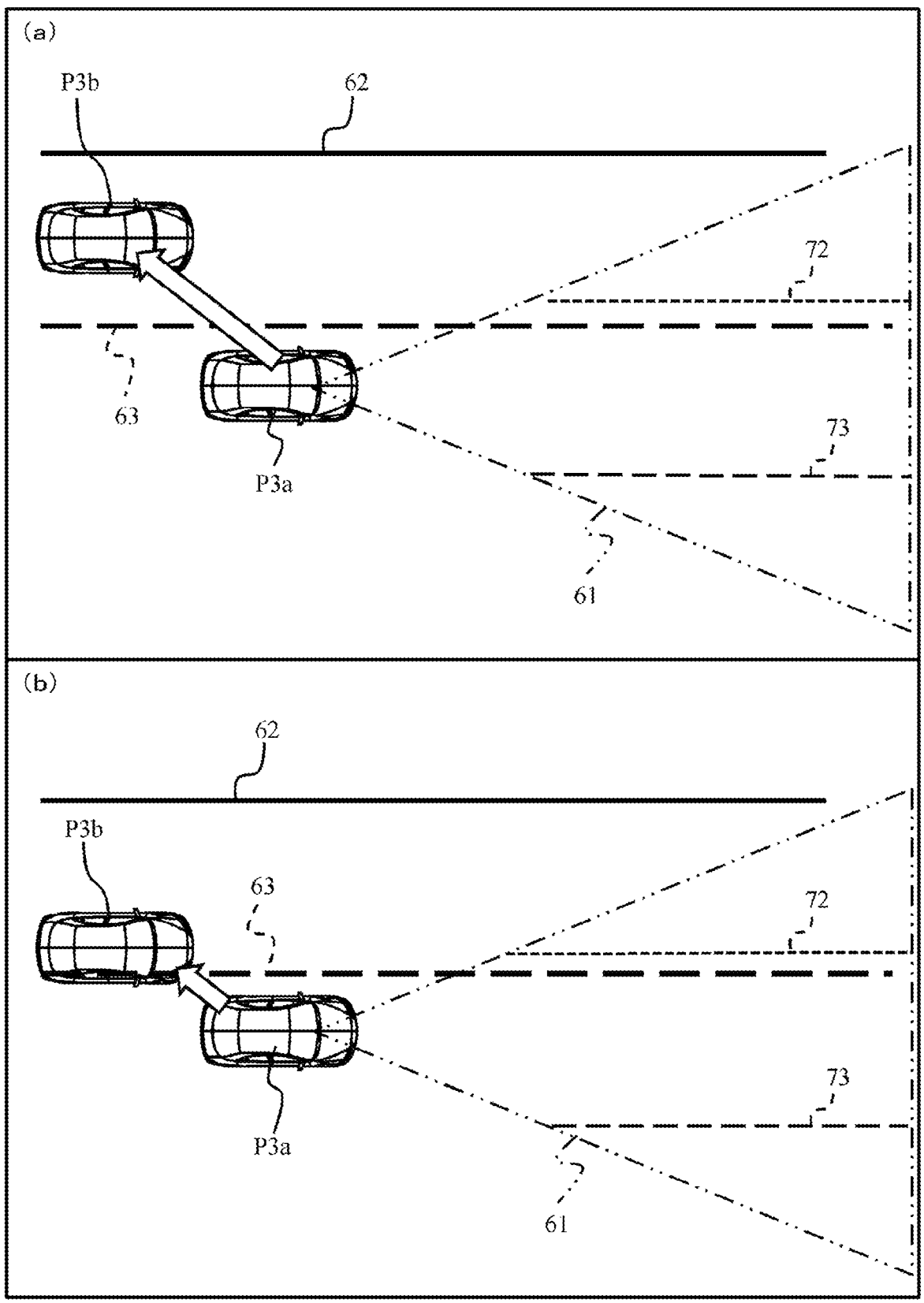
FIG. 16 is an explanatory view illustrating a method of enlarging a travelable range.

A second embodiment will be described with reference to FIGS. 14 to 16. Incidentally, differences from the first embodiment will be mainly described in each of the following embodiments including the present embodiment.

In the first embodiment, the travelable range is created while estimating the current position and the advancing angle of the host vehicle 3 using the outside-world information 22 and the vehicle information 23. However, both the outside-world information 22 and the vehicle information 23 include the detection error of the sensor, and thus, there is also a possibility that non-detection or erroneous detection may occur. Therefore, when sensor information including those errors is directly used to estimate the current position of the host vehicle 3, there is a possibility that the current position may be erroneously estimated due to the detection error, and as a result, there is a risk that the accuracy of the travelable range 143 may be impaired.

Therefore, in the present embodiment, a reliability is determined for each of the operation 21, the outside-world information 22, and the vehicle information 23 such that the information of the outside-world information 22 to be stored in the travelable range 143 can be corrected or selected in the travelable-range enlargement unit 141 based on the reliability.

Figure 14:
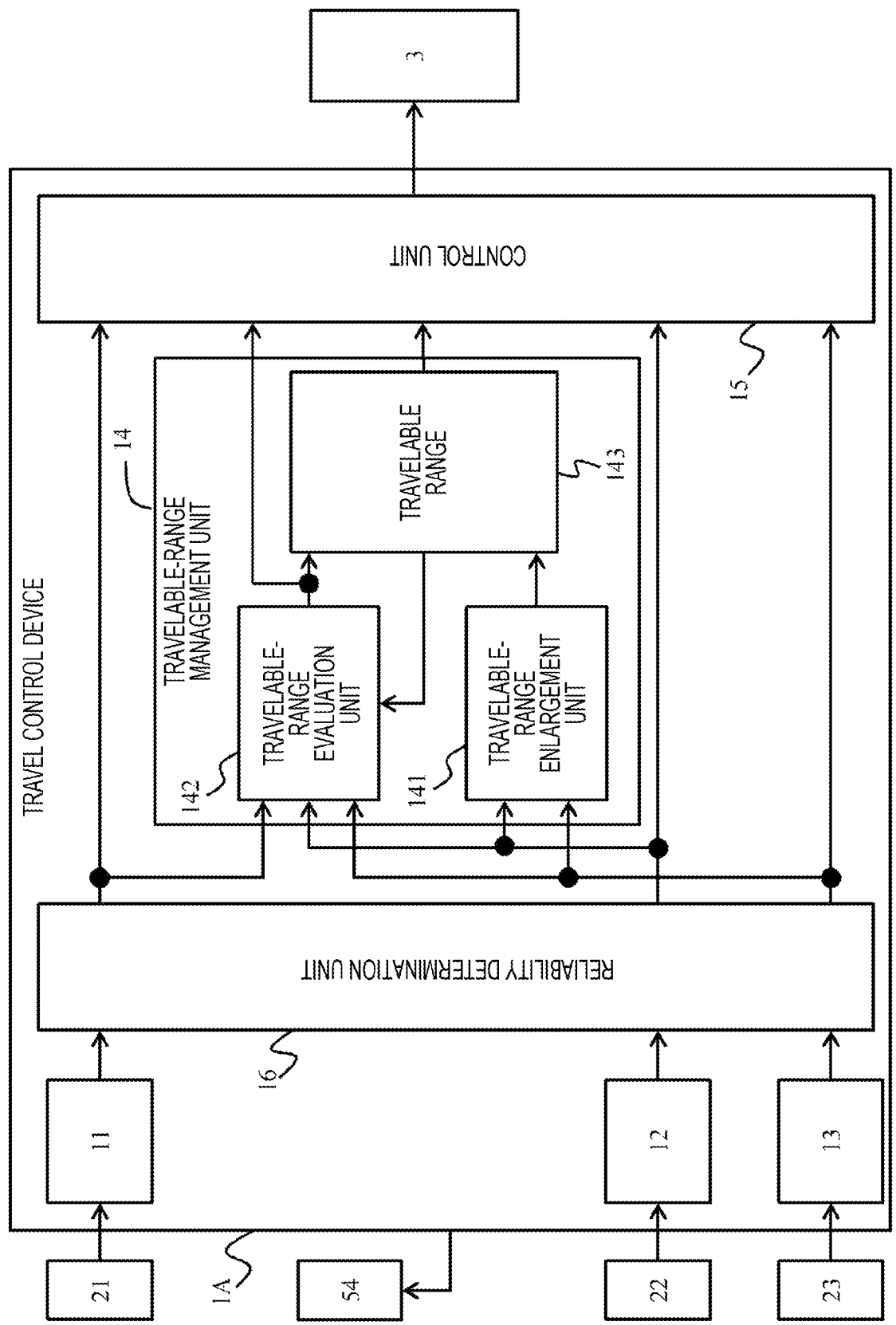
FIG. 14 is a functional block diagram of a travel control device according to a second embodiment.

FIG. 14 is a block diagram illustrating a part of a configuration of a travel control device 1A according to the present embodiment. In the drawing, names of some elements are omitted, and only the reference signs thereof are illustrated.

The travel control device 1A of the present embodiment illustrated in FIG. 14 includes, for example, the operation acquiring unit 11, the outside-world information acquiring unit 12, the vehicle information acquiring unit 13, the travelable-range management unit 14, the control unit 15, and a reliability determination unit 16. The travelable-range management unit 14 includes the travelable-range enlargement unit 141 and the travelable-range evaluation unit 142 similarly to the first embodiment. Configurations and operations of the operation acquiring unit 11, the outside-world information acquiring unit 12, the vehicle information acquiring unit 13, the control unit 15, and the travelable-range evaluation unit 142 are the same as those of the first embodiment, and thus, will not be described.

The reliability determination unit 16 determines a reliability of each piece of information regarding the operation 21, the outside-world information 22, and the vehicle information 23, which are acquired by the operation acquiring unit 11, the outside-world information acquiring unit 12, and the vehicle information acquiring unit 13, and adds a value corresponding to the reliability to information as a determination target.

An example of an operation of the reliability determination unit 16 will be described with reference to FIG. 15. FIG. 15(a) illustrates a case where current position information is acquired using a GPS as the vehicle information 23. A solid line 401 indicates an actual travel route of the host vehicle 3, and a broken line 402 indicates a travel route acquired by the GPS. The GPS is likely to cause an error due to the influence of a positional relationship of satellites and a multipath caused by obstacles such as buildings, and thus, such an error that the solid line 401 and the broken line 402 deviate from each other as illustrated in FIG. 15(a) may easily occur.

FIG. 15(b) is an example in which a numerical value corresponding to the reliability is represented by a continuous value of 0 to 1. The value closer to represents the higher reliability, that is, the smaller error, and the value closer to "0" represents the lower reliability, that is, the larger error. In particular, the reliability 403 is calculated to be low at a spot where the broken line 402 deviates from the solid line 401.

FIG. 15(c) is an example in the case of using an error variance value as the numerical value corresponding to the reliability. The error variance value represents the solid line 401 and the broken line 402 as point groups, respectively, and at this time, an error variance value V in a certain section can be calculated based on, for example, the following formula 1.

$$V = \Sigma\{(X2-X1)^2 + (Y2-Y1)^2\}/N \quad \text{(Formula 1)}$$

Here, (X1, Y1) represents X and Y coordinates of each point group of the solid line 401, (X1, Y1) represents X and Y coordinates of each point group of the broken line 402, $\Sigma$ is a total value of all points, and N represents the number of point groups. In the above Formula 1, the error variance value V becomes larger as the solid line 401 and the broken line 402 are separated farther. That is, it is considered that the accuracy (reliability) of the GPS decreases as V increases.

As a method of adding the value of the reliability to the operation 21, the outside-world information 22, and the vehicle information 23, for example, there is a method of adding a value, such as the reliability and the error variance value, to two-variable information representing a current position (latitude and longitude, or X and Y coordinates in an absolute coordinate system on the ground on the basis of a predetermined point) and converting the two-variable information into three-variable information. Incidentally, the numerical value corresponding to the reliability is not limited to the values described in FIGS. 15(b) and 15(c), and the reliability may be, for example, a binary value of 0 (unreliable) or 1 (reliable) or may be defined as a physical quantity other than the error variance.

The travelable-range enlargement unit 141 generates the travelable range 143 based on the outside-world information 22 and the vehicle information 23. Basic operations and configurations are the same as those of the first embodiment, and a difference from the first embodiment is that a current position is estimated by newly adding the reliability calculated based on the reliability determination unit 16 in the current position estimation of the host vehicle 3 described in FIG. 4.

A method of estimating the current position of the host vehicle 3 based on the reliability will be described with reference to FIG. 16. FIG. 16 illustrates an example of a case where white lines 72 and 73 on a road surface acquired by the sensor 31 as the outside-world information 22 and current position information obtained by the GPS as the vehicle information 23 have been acquired. Although the position error of the GPS is compensated based on the white lines 72 and 73 acquired by the sensor 31 in the first embodiment as described in FIG. 4, there is a possibility that an error may occur even in the white line detection result by the sensor 31. For example, when the sensor 31 is a front camera, object detection accuracy may greatly deteriorate due to backlighting or the like. Therefore, the reliability is calculated for each of the GPS and the sensor 31, and the position error is compensated based on the information with higher reliability.

FIG. 16(a) illustrates a case where the reliability of the sensor 31 is higher than that of the GPS. Although the current position of the host vehicle based on GPS is P3a, it is necessary to correct the current position because the reliability of the GPS is low. Positions of white lines 72 and 73 detected in the detection range 61 of the sensor 31 are collated with positions of white lines 62 and 63 stored in the travelable range 143, and the current position is corrected from P3a to P3b.

FIG. 16(b) illustrates a case where the reliability of the sensor 31 is lower than that of the GPS. The current position of the host vehicle 3 based on the GPS is P3a, and the GPS always has an error, and thus, it is also necessary to correct the current position. In this case, however, the positions of the white lines 72 and 73 detected by the sensor 31 are less reliable than the current position based on the GPS, and thus, the corrected amount of the current position P3b after correction is smaller than that of FIG. 16(a).

In this manner, according to the travel control device 1A of the present embodiment, the travelable range 143 can be generated preferentially using the information with higher reliability by providing the means 16 for determining the reliability of each of the operation 21, the outside-world information 22 and the vehicle information 23. As a result, it is possible to provide the travel control device 1A that realizes the more stable enlargement of the travelable range 143 in the present embodiment.

Third Embodiment

A third embodiment will be described with reference to FIGS. 17 and 18. The example in which the travelable range is enlarged by the host vehicle 3 alone has been described in the first and second embodiments. When the host vehicle 3 includes the communication device 53, a travelable range created by another vehicle can be acquired via the communication device 53. As a result, it is possible to generate the travelable range 143 having a wider region and a larger amount of information.

Therefore, a means 17 for acquiring the travelable range generated by the other vehicle via the communication device 53 mounted on the host vehicle 3 is provided in the present embodiment.

Figure 17:
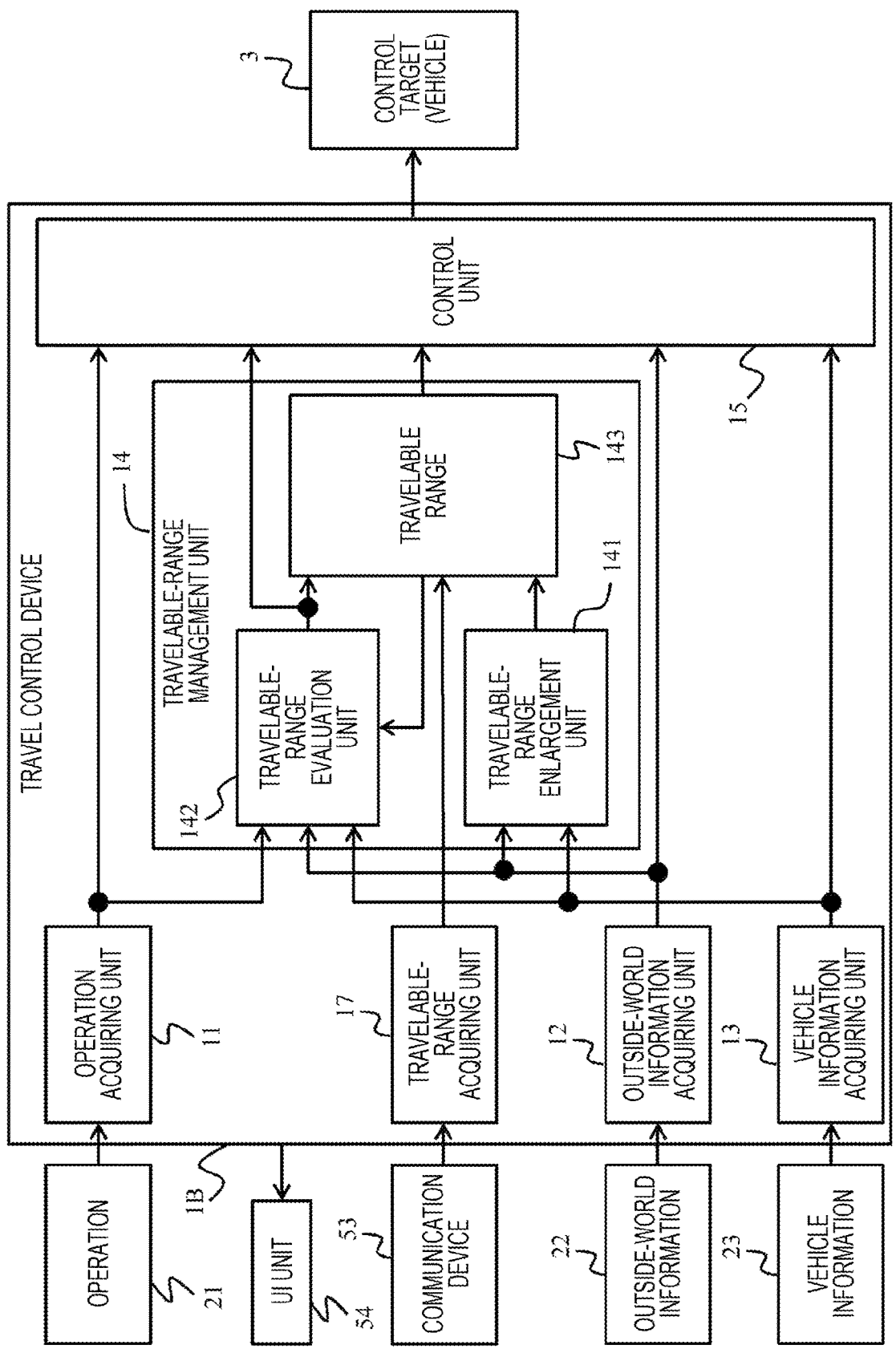
FIG. 17 is a functional block diagram of a travel control device according to a third embodiment.

FIG. 17 is a block diagram illustrating a part of a configuration of a travel control device 1B according to the present embodiment. The travel control device 1B includes, for example, the operation acquiring unit 11, the outside-world information acquiring unit 12, the vehicle information acquiring unit 13, the travelable-range management unit 14, the control unit 15, the communication device 53, and a travelable-range acquiring unit 17. The travelable-range management unit 14 further includes the travelable-range enlargement unit 141 and the travelable-range evaluation unit 142. Configurations and operations of the operation acquiring unit 11, the outside-world information acquiring unit 12, the vehicle information acquiring unit 13, the control unit 15, the travelable-range enlargement unit 141, and the travelable-range evaluation unit 142 are the same as those of the first embodiment, and thus, will not be described.

The travelable-range acquiring unit 17 acquires a travelable range 410 created by another vehicle via the communication device 53 mounted on the host vehicle 3, and integrates the travelable range 143 into the travelable range 143 stored in the travelable-range management unit 14 to generate the highly precise travelable range 143 having a larger amount of information.

Examples of the communication device 53 include a cellular line, public WiFi, a method using a dedicated communication line, and the like. The travelable range 410 may be acquired from a cloud server that collects and manages a travelable range from each vehicle, or may be acquired directly from another vehicle using vehicle-to-vehicle communication. A method of acquiring the travelable range 410 is not limited to the communication device 53. For example, the same effect can be realized by incorporating the travelable range 410 stored in a storage medium such as a USB memory and an SD card into the travel control device 1.

An example of an operation of the travelable-range acquiring unit 17 will be described with reference to FIG. 18. FIG. 18(*a*) illustrates an example of the outside-world information 22 obtained in a certain scene. Here, white lines 62 and 63 and a sign 65 present in the detection range 61 of the sensor 31 are detected by the sensor 31. In addition, it is assumed that a sign 64 is also present as an object that may be detected by the sensor 31, but a detection algorithm of the sensor 31 has failed to detect the sign 64 for some reason.

In this case, the travelable-range acquiring unit 17 uses the communication device 53 to search whether the travelable range 410 created by the other vehicle in the above place exists, and acquires the travelable range 410 when the travelable range 410 exists. As described above, the travelable-range acquiring unit 17 inquires the cloud server or inquires another vehicle traveling in the periphery to search the travelable range 410 created by the other vehicle.

Figure 18:
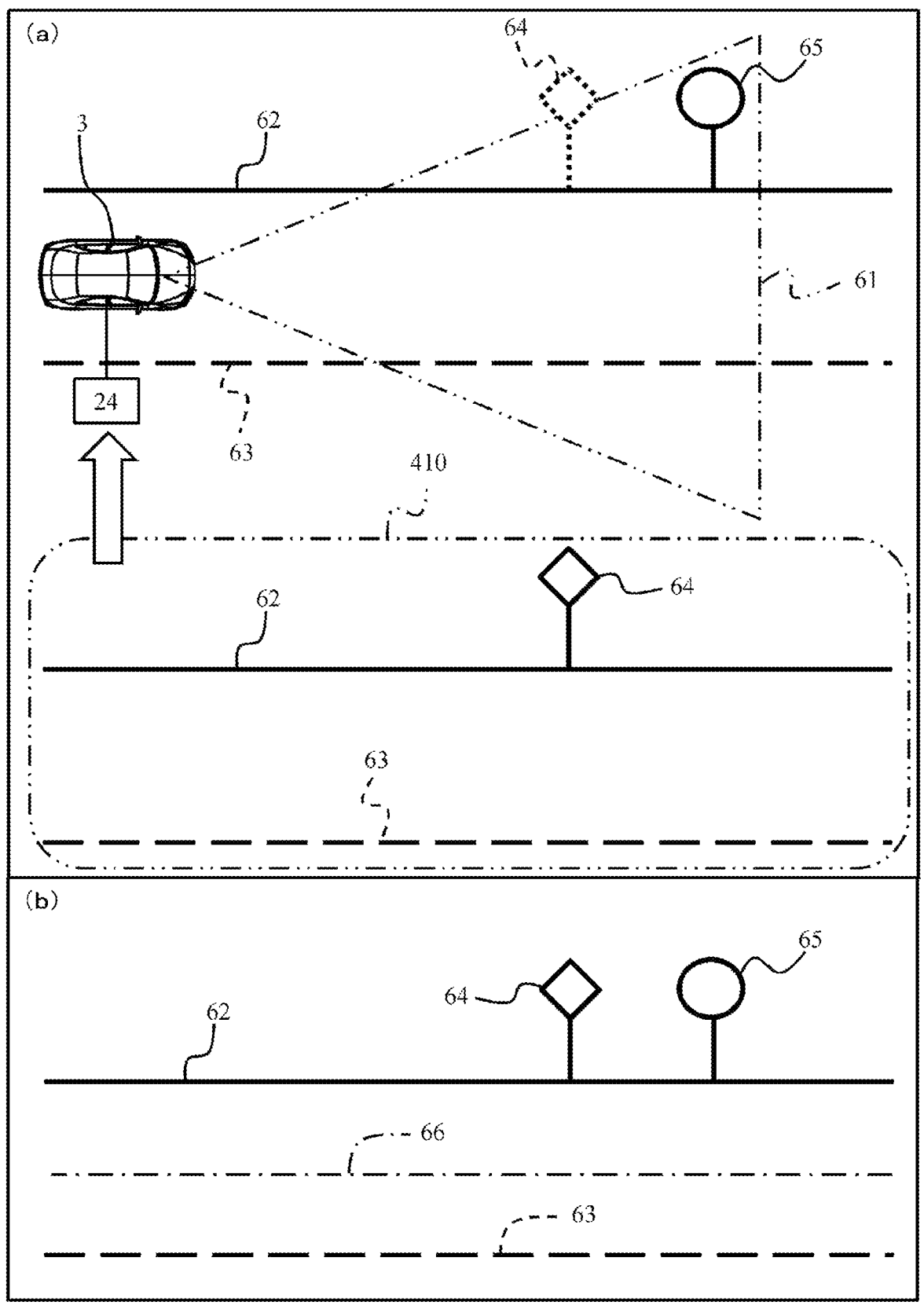
FIG. 18 is an explanatory view illustrating how a travelable range acquired from another vehicle and a travelable range of a host vehicle are integrated.

Here, it is assumed that the white lines 62 and 63 and the sign 64 are included in the travelable range 410 as surrounded by a broken line in FIG. 18(*a*). Therefore, both the sign 64 and the sign 65 are stored in the travelable range 143, as illustrated in FIG. 18(*b*), by integrating the outside-world information 22 detected by the sensor 31 and the travelable range 410 created by the other vehicle, which results in a richer amount of information. In addition, in this method, it is also possible to enhance the information accuracy of the travelable range 143 by integrating the travelable range 410 acquired by a vehicle equipped with a more expensive and highly precise sensor as compared with the case where the host vehicle 3 acquires the outside-world information 22 alone. That is, it is possible to enhance the accuracy of the travelable range 143 created by the host vehicle 3 using the other vehicle equipped with the highly precise sensor.

In this manner, according to the travel control device 1B of the present embodiment, it is possible to realize the enlargement of the travelable range 143 with higher accuracy and the richer amount of information by acquiring the travelable range 410 created by the other vehicle via communication.

In each of the above-described embodiments, the description has been given by exemplifying the case where the information stored in the travelable range 143 is the white line on the road surface or the landmark such as the sign. Instead, the travelable range 143 may be a 3D shape (point group) relating to an object in the periphery of the host vehicle. In this case, a sensor (such as a laser scanner) capable of acquiring outside-world information as a 3D point group is mounted on the host vehicle 3, and an iterative closest point (ICP) algorithm or the like is used, so that it is possible to estimate a current position and an advancing angle of the vehicle 3 in the same manner.

In each of the above-described embodiments, the description has been given by exemplifying the automatic driving of the car as the travel control, but the travel control is not limited to the automatic driving. For example, the present invention can be applied to various forms of travel control such as inter-vehicle distance control (active cruise control), lane keeping, automatic driving level 2, automatic driving level 3, and unmanned automatic driving. At this time, the travelable-range evaluation unit 142 may determine which travel control is possible instead of whether travel control is possible.

Although the description has been given by exemplifying the car in each of the above-described embodiments, the present invention is applicable to any device that moves autonomously. For example, the present invention can be also applied to a construction machine (such as a mine dump) that performs autonomous movement, a small mobility (a single-seat small car, a motorcycle, an inverted pendulum mobility, or the like), an autonomous mobile robot, and the like.

Incidentally, the present invention is not limited to the above embodiments and includes various modifications. For example, the above embodiments have been described in detail in order to describe the present invention in an easily understandable manner, and are not necessarily limited to those including the entire configuration that has been described above. Further, some configurations of a certain embodiment can be substituted by configurations of another embodiment, and further, a configuration of another embodiment can be also added to a configuration of a certain embodiment. In addition, addition, deletion, or substitution of other configurations can be made with respect to some configurations of each embodiment.

Although the present invention has been described as above, the present invention is not limited to the above-described embodiments, and includes various modifications. For example, the above respective embodiments have been described in detail in order to facilitate understanding of the present invention, and the invention is not necessarily limited to include the entire configuration described above.

A part of the configuration of a certain embodiment can be also replaced with the configuration of another embodiment. The configuration of one embodiment can be also added with the configuration of another embodiment. A part of the configuration of each embodiment can be deleted, added with another configuration, or replaced with another configuration.

A part or all of each of the above configurations, functions, processing units, processing units, and the like may be realized, for example, by hardware by designing with an integrated circuit and the like. In addition, each of the above configurations, functions, and the like may also be realized by software by causing a processor to interpret and execute a program for realizing each of the functions. Information such as programs, tables, and files that realize the respective functions can be stored in a storage device such as a nonvolatile semiconductor memory, a hard disk drive, and a solid state drive (SSD), or a computer-readable non-transitory data storage medium such as an IC card, an SD card, and a DVD.

In addition, only control lines and information lines considered to be necessary for the description have been illustrated, and all of the control lines and information lines required as a product are not necessarily illustrated. It may be considered that most of configurations are practically connected to each other.

Further, the above-described embodiments can be combined as appropriate, and combinations of those embodiments are also included in the scope of the present invention.

REFERENCE SIGNS LIST 1, 1A, 1B travel control device
3 vehicle
11 operation acquiring unit
12 outside-world information acquiring unit
13 vehicle information acquiring unit
14 travelable-range management unit
16 reliability determination unit
17 travelable-range acquiring unit
21 operation
22 outside-world information
23 vehicle information
53 communication device
54 user interface unit
141 travelable-range enlargement unit
142 travelable-range evaluation unit
143 travelable range

The invention claimed is:

1. A travel controller configured to control travel of a moving body, the travel controller including at least one processor and configured to:
   acquire an operation by a driver of a host moving body;
   acquire outside-world information of a periphery of the host moving body;
   acquire moving-body information relating to a travel state of the host moving body;
   manage a range travelable by the moving body; and
   control travel by the moving body based on the operation acquired, the outside-world information acquired, the moving-body information acquired, and the travelable range managed,
the travel controller further configured to:
   use map information as the travelable range;
   provide information to the driver;
   receive information from the driver;
   use the information provided to the driver and the received information from the driver to request the driver to select either a travelable-range enlargement mode or a travelable-range evaluation mode to be executed and perform control in accordance with a request of the driver in the travelable range where it is determined that a predetermined condition is satisfied, the travel controller further configured to:
      perform travel control corresponding to the travelable-range evaluation mode to determine whether the travelable range satisfies the predetermined condition in a place where the travelable range exists; or
      perform manual travel corresponding to the travelable-range enlargement mode to generate the travelable range in a place where the travelable range does not exist;
wherein the travel controller is further configured to:
   determine that travel control is possible when the travelable range as the evaluation target satisfies the predetermined condition by calculating a degree of a wobble of the host moving body using at least one of the operation, the outside-world information, or the moving-body information obtained when the travel control is performed for the travelable range as the evaluation target, and
   determine that travel control is not possible when the degree of wobble at the time of travel control is greater than a predetermined value;
      wherein the degree of wobble is a deviation or dispersion of vehicle information; and
   permit the driver to set the predetermined value in advance, or set the predetermined value based on a driving behavior of a driver.

2. The travel controller for a moving body according to claim 1, wherein the travel controller is further configured to:
   acquire a current position and an advancing angle of the host moving body based on the outside-world information and the moving-body information when the travelable range does not exist,
   correct the current position and the advancing angle of the host moving body based on the travelable range, the outside-world information, and the moving-body information when the travelable range exists, and
   store the outside-world information as the travelable range based on the acquired or corrected current position and advancing angle.

3. The travel controller for a moving body according to claim 2, the travel controller is further configured to:
   determine a reliability of at least one of the operation, the outside-world information, and the moving-body information, correct the current position and the advancing angle of the host moving body based on the reliability.

4. The travel controller for a moving body according to claim 1, wherein the travel controller is further configured to:
   reflect latest outside-world information as the travelable range when the outside-world information obtained when travel is performed a plurality of times is stored in the travelable range.

5. The travel controller for a moving body according to claim 1, wherein the travel controller is further configured to:
   comprehensively use outside-world information corresponding to a plurality of times of travel as the travelable range when the outside-world information obtained when travel is performed a plurality of times is stored in the travelable range.

6. The travel controller for a moving body according to claim 1, wherein the travel controller is further configured to:
   determine that the driver causes a wobble when a variation of the operation exceeds a predetermined range and averages information corresponding to a traveling track of a plurality of times of travel statistically as the moving body information, and
   store the moving-body information in the travelable range as a road shape when the variation of the operation falls within the predetermined range.

7. The travel controller for a moving body according to dam 1, wherein the travel controller is further configured to:
   determine an override of travel control by the driver based on the operation when the travel control is performed for the travelable range as the evaluation target, and
   determine a travel control possibility based on the override.

8. The travel controller for a moving body according to claim 1, wherein the travel controller is further configured to:
    interrupt the travel control if the operation by the driver is input when the travel control is performed for the travelable range as the evaluation target.

9. The travel controller for a moving body according to claim 1, wherein the travel controller is further configured to:
    integrate the outside-world information obtained during manual travel by the driver into the travelable range.

10. The travel controller for a moving body according to claim 1, the travel controller is further configured to:
    perform communication between moving bodies or between a moving body and a road;
    acquire a travelable range of another moving body via the communication; and
    integrate the travelable range of the other moving body acquired into a travelable range of the host moving body.

* * * * *